(12) United States Patent
Alig et al.

(10) Patent No.: US 11,058,114 B2
(45) Date of Patent: Jul. 13, 2021

(54) USE OF N-ARYLAMIDINE-SUBSTITUTED TRIFLUOROETHYL SULPHOXIDE DERIVATIVES FOR CONTROLLING PESTS BY WATERING, DROPLET APPLICATION, DIP APPLICATION, SOIL INJECTION OR BY TREATING SEED

(71) Applicant: BAYER CROPSCIENCE AKTIENGESELLSCHAFT, Monheim am Rhein (DE)

(72) Inventors: Bernd Alig, Königswinter (DE); Silvia Cerezo-Galvez, Langenfeld (DE); Reiner Fischer, Monheim (DE); Adeline Köhler, Langenfeld (DE); Julia Johanna Hahn, Düsseldorf (DE); Peter Lösel, Leverkusen (DE); Olga Malsam, Rösrath (DE)

(73) Assignee: BAYER CROPSCIENCE AKTIENGESELLSCHAFT, Monheim am Rhein (DE)

( * ) Notice: Subject to any disclaimer, the term of this patent is extended or adjusted under 35 U.S.C. 154(b) by 508 days.

(21) Appl. No.: 15/301,347

(22) PCT Filed: Mar. 31, 2015

(86) PCT No.: PCT/EP2015/056941
§ 371 (c)(1),
(2) Date: Sep. 30, 2016

(87) PCT Pub. No.: WO2015/150348
PCT Pub. Date: Oct. 8, 2015

(65) Prior Publication Data
US 2017/0181430 A1   Jun. 29, 2017

(30) Foreign Application Priority Data

Apr. 4, 2014 (EP) .................................... 14163528

(51) Int. Cl.
*A01N 41/10* (2006.01)
*A01N 43/36* (2006.01)
*A01N 43/54* (2006.01)
*A01N 43/78* (2006.01)
*A01N 37/52* (2006.01)

(52) U.S. Cl.
CPC ............. *A01N 41/10* (2013.01); *A01N 37/52* (2013.01); *A01N 43/36* (2013.01); *A01N 43/54* (2013.01); *A01N 43/78* (2013.01)

(58) Field of Classification Search
CPC ....................................................... A01N 41/10
See application file for complete search history.

(56) References Cited

FOREIGN PATENT DOCUMENTS

| EP | 2606726 A1 | 6/2013 |
|----|------------|--------|
| WO | 2007/131680 A1 | 11/2007 |
| WO | 2011/006605 A1 | 1/2011 |
| WO | 2013/092350 A1 | 6/2013 |

OTHER PUBLICATIONS

International Search Report of International Patent Application No. PCT/EP2015/056941 dated May 26, 2015.

*Primary Examiner* — Yong S. Chong
(74) *Attorney, Agent, or Firm* — McBee Moore & Vanik IP, LLC

(57) ABSTRACT

The present invention relates to the use of compounds of the formula (I)

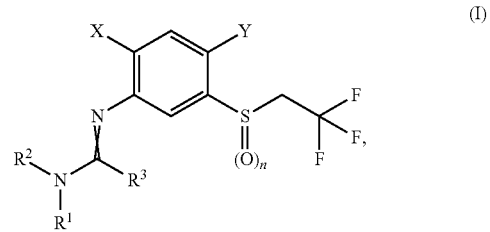

in which $R^1$, $R^2$, $R^3$, n, X and Y have the meanings given in the description, for controlling animal pests, in particular insects and/or spider mites and/or nematodes, by drenching the soil, by drip application to the soil, by immersing roots, tubers or bulbs, or by soil injection or for treating seed.

15 Claims, No Drawings

USE OF N-ARYLAMIDINE-SUBSTITUTED TRIFLUOROETHYL SULPHOXIDE DERIVATIVES FOR CONTROLLING PESTS BY WATERING, DROPLET APPLICATION, DIP APPLICATION, SOIL INJECTION OR BY TREATING SEED

CROSS-REFERENCE TO RELATED APPLICATIONS

This application is a National Stage entry of International Application No. PCT/EP2015/056941, filed Mar. 31, 2015, which claims priority to European Patent Application No. 14163528.4, filed Apr. 4, 2014.

BACKGROUND

Field of the Invention

The present invention relates to the use of N-arylamidine-substituted trifluoroethyl sulphoxide derivatives for controlling insects and/or spider mites and/or nematodes by watering, droplet application, dip application, soil injection or by treating seed.

Description of Related Art

The insecticidal and acaricidal action of N-arylamidine-substituted trifluoroethyl sulphoxide derivatives following spray application is known from WO 2007/131680 and WO 2013/092350.

SUMMARY

Surprisingly it has now been found that N-arylamidine-substituted trifluoroethyl sulphoxide derivatives are also highly suitable for controlling animal pests, in particular insects and/or spider mites and/or nematodes, by watering the soil (among experts referred to as "drenching"), by droplet application onto the soil and/or also directly to the roots (among experts referred to as "drip application"), by immersing roots, tubers or bulbs (among experts referred to as "dip application") or by hydroponic systems or injection into the soil (among experts referred to as "soil injection"). Furthermore, it has surprisingly been found that such compounds are also suitable for treating seed.

Accordingly, the present invention relates to the use of N-arylamidine-substituted trifluoroethyl sulphoxide derivatives for controlling animal pests, in particular insects and/or spider mites and/or nematodes, by watering the soil, by droplet application to the soil, in particular in irrigation systems, by immersing roots, tubers or bulbs, by soil injection or for treating seed. By virtue of their very good systemic action, such compounds are particularly suitable for these application forms. Such compounds are also suitable for other application forms where systemic action is required or advantageous. The present invention furthermore relates to these application forms on natural substrates (soil) or artificial substrates (for example rock wool, glass wool, quartz sand, gravel, expanded clay, vermiculite), outdoors or in closed systems (for example greenhouses or under cloches) and in annual (for example vegetables, spices, ornamental plants) or perennial (for example citrus plants, fruit, tropical crops, spices, nuts, grapes, conifers and ornamental plants) crops.

DETAILED DESCRIPTION OF A PREFERRED EMBODIMENT

The crops to be protected which have only been described in general terms will be specified in greater detail and differenciated hereinbelow. Thus, as regards the use, vegetables are understood as meaning for example fruiting vegetables and inflorescences as vegetables, for example bell peppers, chillies, tomatoes, aubergines, cucumbers, pumpkins, courgettes, broad beans, runner beans, dwarf beans, peas, artichokes, maize; but also leafy vegetables, for example head-forming lettuce, chicory, endives, various types of cress, rocket, lamb's lettuce, iceberg lettuce, leeks, spinach, Swiss chard;

furthermore tuber, root and stem vegetables, for example celeriac/celery, beetroot, carrots, radishes, horseradish, scorzonera, asparagus, beets for human consumption, palm shoots, bamboo shoots, furthermore bulb vegetables, for example onions, leek, fennel, garlic;

furthermore *Brassica* vegetables such as cauliflower, broccoli, kohlrabi, red cabbage, white cabbage, curly kale, Savoy cabbage, Brussel sprouts, Chinese cabbage.

Regarding the use, perennial crops are understood as meaning citrus, such as, for example, oranges, grapefruits, tangerines, lemons, limes, Seville oranges, kumquats, satsumas;

but also pome fruit such as, for example, apples, pears and quinces, and stone fruit, such as, for example, peaches, nectarines, cherries, plums, quetsch, apricots, almonds, pistachios, olives;

furthermore grapevines, hops, tea and tropical crops such as, for example, mangoes, papayas, figs, pineapples, dates, bananas, durians, kaki fruit, coconuts, cacao, coffee, avocados, lychees, maracujas, guavas, moreover almonds and nuts such as, for example, hazelnuts, walnuts, cashew nuts, para nuts, pecan nuts, butternuts, chestnuts, hickory nuts, macadamia nuts, peanuts, moreover also soft fruit such as, for example, redcurrants, gooseberries, raspberries, blackberries, blueberries, strawberries, cranberries, including American cranberries, kiwi fruit.

As regards the use, ornamentals are understood as meaning annual and perennial plants, for example cut flowers such as, for example, roses, carnations, *gerbera*, lilies, marguerites, chrysanthemums, tulips, narcissi, anemones, poppies, amaryllis, dahlias, azaleas, mauves, but also for example bedding plants, pot plants and perennials such as, for example, roses, *Tagetes*, violas, geraniums, fuchsias, hibiscus, chrysanthemums, busy lizzies, cyclamen, African violet, sunflowers, begonias, furthermore for example bushes and conifers such as, for example, *ficus, rhododendron*, firs, spruces, pines, including umbrella pines, yews, juniper, *oleander.*

As regards the use, spices are understood as meaning annual and perennial plants such as, for example, aniseed, chilli pepper, paprika, pepper, vanilla, marjoram, thyme, cloves, juniper berries, cinnamon, tarragon, coriander, saffron, ginger.

Further applications are in field crops such as cotton, maize and soya beans.

The N-arylamidine-substituted trifluoroethyl sulphoxide derivatives are compounds of the formula (I)

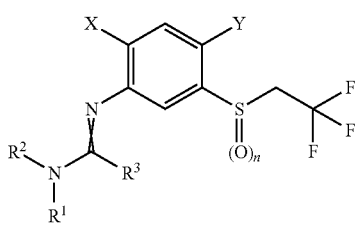

(I)

where (Embodiment 1-1)
n represents the number 0 or 1,
X, Y independently of one another
represent hydrogen, fluorine, chlorine, bromine, iodine, ($C_1$-$C_4$)-alkyl, ($C_1$-$C_4$)-haloalkyl, ($C_1$-$C_4$)-alkoxy, ($C_1$-$C_4$)-haloalkoxy or aminothiocarbonyl,
or represent ($C_3$-$C_6$)-cycloalkyl, phenyl, pyridyl, pyrimidyl, pyridazinyl, pyrazinyl, triazinyl, thiazolyl, thiadiazolyl, oxazolyl, oxadiazolyl, pyrazolyl, triazolyl or tetrazolyl which is optionally mono- or disubstituted by identical or different substituents from the group consisting of fluorine, chlorine, bromine, cyano, nitro, ($C_1$-$C_4$)-alkyl, ($C_1$-$C_4$)-haloalkyl, ($C_1$-$C_4$)-alkoxy, ($C_1$-$C_4$)-haloalkoxy or ($C_3$-$C_6$)-cycloalkyl,
$R^3$ represents hydrogen, ($C_2$-$C_4$)-alkyl, cyano, ($C_1$-$C_4$)-haloalkyl, ($C_1$-$C_4$)-alkoxy-($C_1$-$C_4$)-alkyl or ($C_1$-$C_4$)-cyanoalkyl,
or represents a 3- to 6-membered saturated, partially saturated or aromatic ring which may optionally contain one to two heteroatoms from the group consisting of O, S and N and which is optionally mono- to trisubstituted by identical or different substituents from the group consisting of fluorine, chlorine, bromine, iodine, cyano, nitro, ($C_1$-$C_4$)-alkyl, ($C_1$-$C_4$)-haloalkyl, ($C_2$-$C_4$)-alkenyl, ($C_2$-$C_4$)-alkynyl, ($C_1$-$C_4$)-alkoxy, ($C_1$-$C_4$)-haloalkoxy and ($C_3$-$C_6$)-cycloalkyl,
$R^1$ and $R^2$ independently of one another
represent hydrogen, cyano, ($C_1$-$C_4$)-alkyl, ($C_1$-$C_4$)-haloalkyl, ($C_1$-$C_4$)-alkoxy, ($C_1$-$C_4$)-cyanoalkyl, ($C_1$-$C_4$)-hydroxyalkyl, ($C_1$-$C_4$)-alkoxy-($C_1$-$C_4$)-alkyl, ($C_2$-$C_4$)-alkenyl or ($C_2$-$C_4$)-alkynyl,
or represent ($C_1$-$C_4$)-alkylcarbonyl, ($C_1$-$O_5$)-alkoxycarbonyl, arylcarbonyl, thiophenylcarbonyl, pyridylcarbonyl, pyrimidylcarbonyl, thiazolylcarbonyl, pyrazolylcarbonyl, ($C_1$-$C_4$)-alkylsulphinyl, ($C_1$-$C_4$)-haloalkylsulphinyl, arylsulphinyl, aryl-($C_1$-$C_4$)-alkylsulphinyl, hetarylsulphinyl, hetaryl-($C_1$-$C_4$)-alkylsulphinyl, ($C_1$-$C_4$)-alkylsulphonyl, ($C_1$-$C_4$)-haloalkylsulphonyl, arylsulphonyl, aryl-($C_1$-$C_4$)-alkylsulphonyl, hetarylsulphonyl or hetaryl-($C_1$-$C_4$)-alkylsulphonyl optionally mono- to trisubstituted independently of one another by fluorine, chlorine, bromine, cyano, nitro, ($C_1$-$C_4$)-alkyl, ($C_1$-$C_4$)-haloalkyl, ($C_2$-$C_4$)-alkenyl, ($C_2$-$C_4$)-haloalkenyl, ($C_2$-$C_4$)-alkynyl, ($C_1$-$C_4$)-alkoxy, ($C_1$-$C_4$)-haloalkoxy, ($C_1$-$C_4$)-alkylthio, ($C_1$-$C_4$)-alkylsulphinyl, ($C_1$-$C_4$)-alkylsulphonyl, ($C_1$-$C_4$)-alkylamino, di-($C_1$-$C_4$)-alkylamino,
or represent a 3- to 6-membered saturated or aromatic ring which may optionally contain one to two heteroatoms from the group consisting of O, S and N, which may optionally be interrupted once or twice by C=O and which is optionally mono- or trisubstituted by identical or different substituents from the group consisting of fluorine, chlorine, bromine, cyano, nitro, ($C_1$-$C_4$)-alkyl, ($C_1$-$C_4$)-haloalkyl, ($C_2$-$C_4$)-alkenyl, ($C_2$-$C_4$)-alkynyl, ($C_1$-$C_4$)-alkoxy, ($C_1$-$C_4$)-haloalkoxy and ($C_3$-$C_6$)-cycloalkyl,
or represent —($CH_2$)$_m$—$R^6$ or —($CH_2$)$_m$—O—$R^6$, where $R^6$ represents a 3- to 6-membered saturated, partially saturated or aromatic ring which may optionally contain one to two heteroatoms from the group consisting of O, S and N, which may optionally be interrupted once or twice by C=O and which is optionally mono- or trisubstituted by identical or different substituents from the group consisting of fluorine, chlorine, bromine, cyano, nitro, ($C_1$-$C_4$)-alkyl, ($C_1$-$C_4$)-haloalkyl, ($C_2$-$C_4$)-alkenyl, ($C_2$-$C_4$)-alkynyl, ($C_1$-$C_4$)-alkoxy, ($C_1$-$C_4$)-haloalkoxy and ($C_3$-$C_6$)-cycloalkyl, where m represents the number 1 or 2,
or
$R^1$ and $R^2$ together with the nitrogen atom to which they are attached may form a saturated or unsaturated 3- to 6-membered ring which is optionally mono- or tetrasubstituted by fluorine, chlorine, ($C_1$-$C_4$)-alkyl, ($C_1$-$C_4$)-alkoxy or ($C_1$-$C_4$)-haloalkyl and which may optionally contain a further heteroatom selected from the group consisting of sulphur, oxygen and nitrogen and/or at least one carbonyl group, or
$R^1$ and $R^3$ together with the atoms to which they are attached may form a saturated or unsaturated 5- to 6-membered ring which is optionally mono- or polysubstituted by methyl, ethyl, methoxy, ethoxy, fluorine, chlorine, trifluoromethyl, cyclopropyl, cyano, chlorocyclopropyl, fluorocyclopropyl, cyanocyclopropyl, methylcyclopropyl, ($C_2$-$C_4$)-alkanediyl, ($C_2$-$C_4$)-alkenediyl or butanedienyl (where butanedienyl may optionally be mono- or disubstituted by methyl, fluorine, chlorine, bromine, methoxy or trifluoromethyl and/or may optionally be interrupted by at least one oxygen or/and nitrogen atom) and which may optionally contain a further heteroatom selected from the group consisting of sulphur, oxygen and nitrogen and/or a carbonyl group.

Preferred substituents or ranges for the radicals shown in the compounds of the formula (I) are illustrated below,
where (Embodiment 2-1)
n represents the number 0 or 1,
X and Y independently of one another represent hydrogen, fluorine, chlorine, bromine, methyl, ethyl, trifluoromethyl, difluoromethyl, difluoromethoxy, trifluoromethoxy or OCH$_2$CF$_3$,
where X and Y represent in particular one of the following combinations X/Y: H/F, H/Cl, H/Br, H/methyl, H/ethyl, F/F, Cl/Cl, F/Cl, Br/Br, Br/Cl, Cl/Br, F/Br, methyl/methyl, F/methyl, methyl/Cl, Cl/methyl, methyl/Br, Br/methyl, ethyl/ethyl, F/ethyl, ethyl/Cl, Cl/ethyl, ethyl/Br or Br/ethyl,
$R^3$ represents hydrogen, ethyl, propyl, cyano, trifluoromethyl, difluoromethyl, dichloromethyl, chloromethyl, trichloromethyl, difluorochloromethyl, dichlorofluoromethyl, (2,2,2)-trifluoroethyl, 2-chloro-(2,2)-difluoroethyl, (2,2)-dichloro-2-fluoroethyl, (2,2,2)-trichloroethyl or pentafluoroethyl, or represents ($C_3$-$C_6$)-cycloalkyl, phenyl, pyridyl, pyrimidyl, pyridazinyl, pyrazinyl, triazinyl, thiazolyl, thiadiazolyl, oxazolyl, oxadiazolyl, pyrazolyl, triazolyl or tetrazolyl which is optionally mono- or disubstituted by identical or different subtituents from the group consisting of fluorine, chlorine, bromine, cyano, nitro, ($C_1$-$C_4$)-alkyl, ($C_1$-$C_4$)-haloalkyl, ($C_1$-$C_4$)-alkoxy, ($C_1$-$C_4$)-haloalkoxy and ($C_3$-$C_6$)-cycloalkyl,
$R^1$ represents hydrogen, methyl, ethyl, propyl, butyl, sec-butyl, isopropyl, tert-butyl, (2,2,2)-trifluoroethyl, (2,2)-difluoroethyl, methoxy, ethoxy, methoxymethyl, 2-methoxyethyl, cyanomethyl, 1-cyanoethyl or 2-cyanoethyl, or represents aryl which is optionally mono- or trisubstituted by identical or different substituents from the group consisting of fluorine, chlorine, bromine, cyano, nitro, methyl, ethyl, trifluoromethyl, vinyl, ethynyl, methoxy, ethoxy, difluoromethoxy, trifluoromethoxy, trifluoroethoxy and cyclopropyl, in particular phenyl which is optionally mono- or trisubstituted by identical or different substituents from the group consisting of fluorine, chlorine, bromine, cyano, nitro, methyl, ethyl, trifluoromethyl, vinyl, ethynyl, methoxy, ethoxy, difluoromethoxy, trifluoromethoxy, trifluoroethoxy and cyclopropyl, represents —$(CH_2)_m$—$R^6$, where $R^6$ represents aryl which is optionally mono-, di- or trisubstituted by identical or different substituents from the group consisting of fluorine, chlorine, bromine, cyano, nitro, methyl, ethyl, trifluoromethyl, vinyl, ethynyl, methoxy, ethoxy, difluoromethoxy, trifluoromethoxy, trifluoroethoxy and cyclopropyl, where m represents the number 1, in particular where $R^6$ represents phenyl which is optionally mono-, di- or trisubstituted by identical or different substituents from the group consisting of fluorine, chlorine, bromine, cyano, nitro, methyl, ethyl, trifluoromethyl, vinyl, ethynyl, methoxy, ethoxy, difluoromethoxy, trifluoromethoxy, trifluoroethoxy and cyclopropyl, $R^2$ represents hydrogen, methyl, ethyl, trifluoromethyl, difluoromethyl, dichloromethyl, chloromethyl, trichloromethyl, difluorochloromethyl, dichlorofluoromethyl, (2,2,2)-trifluoroethyl, (2,2)-difluoroethyl, 2-chloro-(2,2)-difluoroethyl, (2,2)-dichloro-2-fluoroethyl, (2,2,2)-trichloroethyl or pentafluoroethyl, or $R^1$ and $R^3$ together with the atoms to which they are attached represent one of the groups below

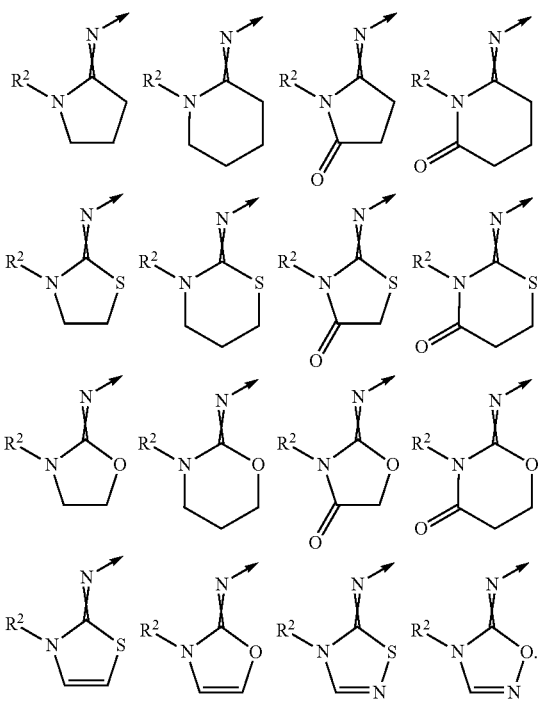

where the group may optionally be mono- or disubstituted by methyl, ethyl, methoxy, ethoxy, fluorine, chlorine, trifluoromethyl, difluoromethyl, cyclopropyl, chlorocyclopropyl, fluorocyclopropyl, cyanocyclopropyl, methylcyclopropyl, and where the arrow points to the remainder of the molecule.

A further embodiment (Embodiment 2-2) corresponds to Embodiment 2-1 where

X and Y independently of one another represent hydrogen, fluorine, chlorine, bromine, methyl, ethyl, trifluoromethyl, difluoromethyl, difluoromethoxy, trifluoromethoxy or $OCH_2CF_3$, where X and Y represent in particular one of the following combinations X/Y: H/F, H/Cl, H/Br, H/methyl, H/ethyl, F/F, Cl/Cl, F/Cl, Br/Br, Br/Cl, Cl/Br, F/Br, methyl/methyl, F/methyl, methyl/Cl, Cl/methyl, methyl/Br, Br/methyl, ethyl/ethyl, F/ethyl, ethyl/Cl, Cl/ethyl, ethyl/Br, Br/ethyl or H/trifluoromethyl.

A further embodiment (Embodiment 2-3) corresponds to Embodiment 2-1 where

X and Y represent the following combination X/Y: H/trifluoromethyl.

Particularly preferred substituents or ranges for the radicals shown in the compounds of the formula (I) are illustrated below, where (Embodiment 3-1)

n represents the number 1,

X and Y represent the following, combinations X/Y: Cl/Cl, F/Cl, Br/Br, Br/Cl, Cl/Br, F/Br, methyl/methyl, F/methyl, methyl/Cl or Cl/methyl, $R^3$ represents ethyl, trifluoromethyl, difluoromethyl, dichloromethyl, chloromethyl, trichloromethyl, difluorochloromethyl or dichlorofluoromethyl, or represents cyclopropyl which may optionally be monosubstituted by fluorine, chlorine, cyano, methyl, trifluoromethyl or methoxy, or represents phenyl, pyridyl, pyrimidyl, pyrazinyl or pyridazinyl which is optionally monosubstituted by fluorine, chlorine, cyano, nitro, methyl, trifluoromethyl, methoxy, difluoromethoxy or trifluoromethoxy, $R^1$ represents hydrogen, methyl or ethyl, $R^2$ represents hydrogen, methyl, ethyl, (2,2)-difluoroethyl or (2,2,2)-trifluoroethyl, or $R^1$ and $R^3$ together with the atoms to which they are attached represent one of the groups below

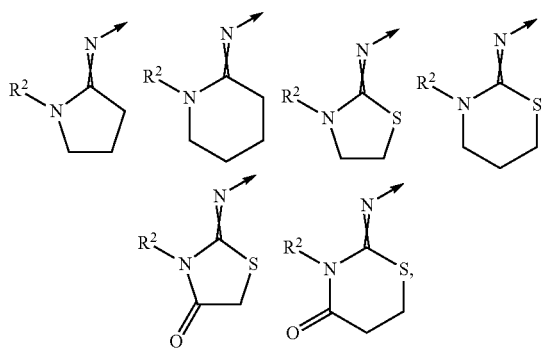

where the arrow points to the remainder of the molecule.

In a further embodiment (Embodiment 3-2), particularly preferred substituents or ranges of the radicals given in the compounds of the formula (I) are defined as follows, where n represents the number 1, X and Y represent the following combinations X/Y: Cl/Cl, F/Cl, Br/Br, Br/Cl, Cl/Br, F/Br, methyl/methyl, F/methyl, methyl/Cl or Cl/methyl, R³ represents ethyl, trifluoromethyl, difluoromethyl, dichloromethyl, chloromethyl, trichloromethyl, difluorochloromethyl or dichlorofluoromethyl, or represents cyclopropyl which may optionally be monosubstituted by fluorine, chlorine, cyano, methyl, trifluoromethyl or methoxy, or represents phenyl, pyridyl, pyrimidyl, pyrazinyl or pyridazinyl which is optionally monosubstituted by fluorine, chlorine, cyano, nitro, methyl, trifluoromethyl, methoxy, difluoromethoxy or trifluoromethoxy, R¹ represents hydrogen, methyl or ethyl, R² represents hydrogen, methyl, ethyl, (2,2)-difluoroethyl or (2,2,2)-trifluoroethyl, or R¹ and R³ together with the atoms to which they are attached represent one of the groups below

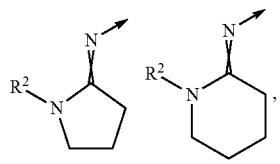

where the arrow points to the remainder of the molecule.

In a further embodiment (Embodiment 3-3), particularly preferred substituents or ranges of the radicals given in the compounds of the formula (I) are defined as follows, where n represents the number 1, X and Y represent the following combinations X/Y: Cl/Cl, F/Cl, Br/Br, Br/Cl, Cl/Br, F/Br, methyl/methyl, F/methyl, methyl/Cl or Cl/methyl, R² represents hydrogen, methyl, ethyl, (2,2)-difluoroethyl or (2,2,2)-trifluoroethyl, and R¹ and R³ together with the atoms to which they are attached represent one of the groups below

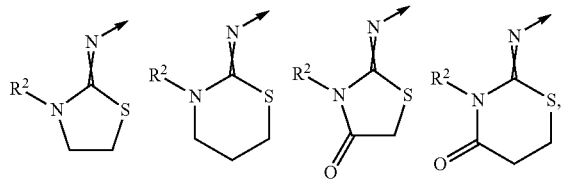

where the arrow points to the remainder of the molecule.

In a further embodiment (Embodiment 3-4), particularly preferred substituents or ranges of the radicals given in the compounds of the formula (I) are defined as follows, where n represents the number 1, X and Y represent the following combinations X/Y: Cl/Cl, F/Cl, Br/Br, Br/Cl, Cl/Br, F/Br, methyl/methyl, F/methyl, methyl/Cl, Cl/methyl or H/trifluoromethyl, R³ represents ethyl, trifluoromethyl, difluoromethyl, dichloromethyl, chloromethyl, trichloromethyl, difluorochloromethyl or dichlorofluoromethyl, or represents cyclopropyl which may optionally be monosubstituted by fluorine, chlorine, cyano, methyl, trifluoromethyl or methoxy, or represents phenyl, pyridyl, pyrimidyl, pyrazinyl or pyridazinyl which is optionally monosubstituted by fluorine, chlorine, cyano, nitro, methyl, trifluoromethyl, methoxy, difluoromethoxy or trifluoromethoxy, R¹ represents hydrogen, methyl or ethyl, R² represents hydrogen, methyl, ethyl, (2,2)-difluoroethyl or (2,2,2)-trifluoroethyl, or R¹ and R³ together with the atoms to which they are attached represent one of the groups below

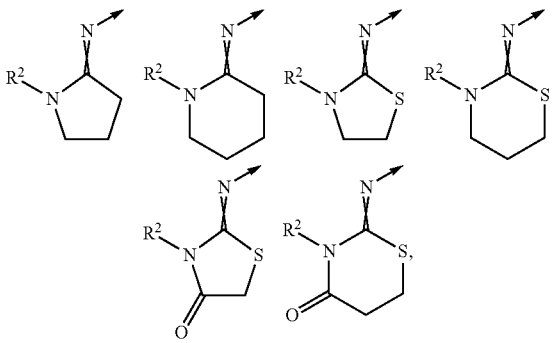

where the arrow points to the remainder of the molecule.

In a further embodiment (Embodiment 3-5), particularly preferred substituents or ranges of the radicals given in the compounds of the formula (I) are defined as follows, where n represents the number 1, X and Y represent the following combinations X/Y: Cl/Cl, F/Cl, Br/Br, Br/Cl, Cl/Br, F/Br, methyl/methyl, F/methyl, methyl/Cl, Cl/methyl or H/trifluoromethyl, R³ represents ethyl, trifluoromethyl, difluoromethyl, dichloromethyl, chloromethyl, trichloromethyl, difluorochloromethyl or dichlorofluoromethyl, or represents cyclopropyl which may optionally be monosubstituted by fluorine, chlorine, cyano, methyl, trifluoromethyl or methoxy, or represents phenyl, pyridyl, pyrimidyl, pyrazinyl or pyridazinyl which is optionally monosubstituted by fluorine, chlorine, cyano, nitro, methyl, trifluoromethyl, methoxy, difluoromethoxy or trifluoromethoxy, R¹ represents hydrogen, methyl or ethyl, R² represents hydrogen, methyl, ethyl, (2,2)-difluoroethyl or (2,2,2)-trifluoroethyl, or R¹ and R³ together with the atoms to which they are attached represent one of the groups below

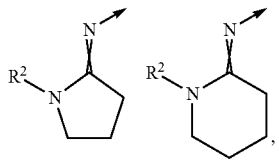

where the arrow points to the remainder of the molecule.

In a further embodiment (Embodiment 3-6), particularly preferred substituents or ranges of the radicals given in the compounds of the formula (I) are defined as follows, where n represents the number 1, X and Y represent the following combinations X/Y: Cl/Cl, F/Cl, Br/Br, Br/Cl, Cl/Br, F/Br, methyl/methyl, F/methyl, methyl/Cl, Cl/methyl or H/trifluoromethyl, R² represents hydrogen, methyl, ethyl, (2,2)-difluoroethyl or (2,2,2)-trifluoroethyl, and R1 and R3 together with the atoms to which they are attached represent one of the groups below

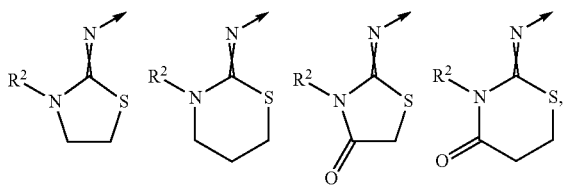

where the arrow points to the remainder of the molecule.

Very particularly preferred substituents or ranges of the radicals shown in the compounds of the formula (I) are elucidated below, where (Embodiment 4-1)

n represents the number 1,

X and Y represent the following combinations X/Y: Cl/Cl, Br/Cl, Cl/Br or F/methyl, R³ represents trifluoromethyl, or represents 1-fluorocyclopropyl, or represents 2-pyrazinyl, R¹ represents hydrogen or methyl, R² represents hydrogen, methyl, (2,2)-difluoroethyl or (2,2,2)-trifluoroethyl, or R¹ and R³ together with the atoms to which they are attached represent one of the groups below

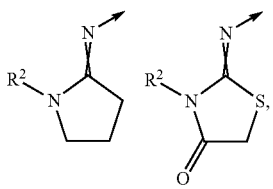

where the arrow points to the remainder of the molecule.

In a further embodiment (Embodiment 4-2), very particularly preferred substituents or ranges of the radicals given in the compounds of the formula (I) are defined as follows, where n represents the number 1, X and Y represent the following combinations X/Y: Cl/Cl, Br/Cl, Cl/Br or F/methyl, R³ represents trifluoromethyl, or represents 1-fluorocyclopropyl, or represents 2-pyrazinyl, R¹ represents hydrogen or methyl, R² represents hydrogen, methyl, (2,2)-difluoroethyl or (2,2,2)-trifluoroethyl, or R¹ and R³ together with the atoms to which they are attached represent the group below

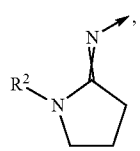

where the arrow points to the remainder of the molecule.

In a further embodiment (Embodiment 4-3), very particularly preferred substituents or ranges of the radicals given in the compounds of the formula (I) are defined as follows, where n represents the number 1, X represents fluorine, Y represents methyl, R² represents (2,2,2)-trifluoroethyl, and R¹ and R³ together with the atoms to which they are attached represent the group below

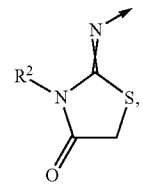

where the arrow points to the remainder of the molecule.

In a further embodiment (Embodiment 4-4), very particularly preferred substituents or ranges of the radicals given in the compounds of the formula (I) are defined as follows, where n represents the number 1, X and Y represent the following combinations X/Y: Cl/Cl, Br/Cl, Cl/Br, F/methyl or H/trifluoromethyl, R³ represents trifluoromethyl, or represents 1-fluorocyclopropyl or 1-chlorocyclopropyl, or represents 2-pyrazinyl, R¹ represents hydrogen or methyl, R² represents hydrogen, methyl, (2,2)-difluoroethyl or (2,2,2)-trifluoroethyl, or R¹ and R³ together with the atoms to which they are attached represent one of the groups below

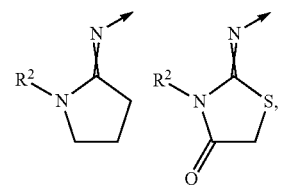

where the arrow points to the remainder of the molecule.

In a further embodiment (Embodiment 4-5), very particularly preferred substituents or ranges of the radicals given in the compounds of the formula (I) are defined as follows, where n represents the number 1, X and Y represent the following combinations X/Y: Cl/Cl, Br/Cl, Cl/Br, F/methyl or H/trifluoromethyl, R³ represents trifluoromethyl, or represents 1-fluorocyclopropyl or 1-chlorocyclopropyl, or represents 2-pyrazinyl, R¹ represents hydrogen or methyl, R² represents hydrogen, methyl, (2,2)-difluoroethyl or (2,2,2)-trifluoroethyl, or R¹ and R³ together with the atoms to which they are attached represent the group below

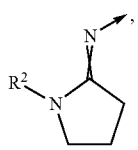

where the arrow points to the remainder of the molecule.

In a further embodiment (Embodiment 4-6), very particularly preferred substituents or ranges of the radicals given in the compounds of the formula (I) are defined as follows, where n represents the number 1, X and Y represent the following combinations X/Y: F/methyl or H/trifluoromethyl, $R^2$ represents (2,2,2)-trifluoroethyl, and $R^1$ and $R^3$ together with the atoms to which they are attached represent the group below

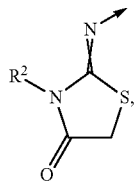

where the arrow points to the remainder of the molecule.

When sulphur and/or nitrogen occur in rings in the above definitions, for example in expressions such as "in which the rings may contain at least one heteroatom from the group of sulphur, oxygen (where oxygen atoms must not be directly adjacent) and nitrogen" or "in which one or two ring members may each be replaced by a heteroatom from the group of sulphur, oxygen (where oxygen atoms must not be directly adjacent) and nitrogen", unless stated otherwise, the sulphur may also be present in the form of SO or $SO_2$; the nitrogen, if it is not in the form of —N═, as well as NH, may also be in the form of N-alkyl (especially N—$C_1$-$C_6$-alkyl).

In the broadest and the preferred definitions, unless stated otherwise, halogen is selected from the group of fluorine, chlorine, bromine and iodine, preferably in turn from the group of fluorine, chlorine and bromine, hetaryl (synonymous with heteroaryl, including as part of a larger unit, for example hetarylalkyl) is selected from the group of furyl, thienyl, pyrrolyl, pyrazolyl, imidazolyl, 1,2,3-triazolyl, 1,2,4-triazolyl, oxazolyl, isoxazolyl, thiazolyl, isothiazolyl, 1,2,3-oxadiazolyl, 1,2,4-oxadiazolyl, 1,3,4-oxadiazolyl, 1,2,5-oxadiazolyl, 1,2,3-thiadiazolyl, 1,2,4-thiadiazolyl, 1,3,4-thiadiazolyl, 1,2,5-thiadiazolyl, pyridyl, pyrimidinyl, pyridazinyl, pyrazinyl, 1,2,3-triazinyl, 1,2,4-triazinyl, 1,3,5-triazinyl, benzofuryl, benzisofuryl, benzothienyl, benzisothienyl, indolyl, isoindolyl, indazolyl, benzothiazolyl, benzisothiazolyl, benzoxazolyl, benzisoxazolyl, benzimidazolyl, 2,1,3-benzoxadiazole, quinolinyl, isoquinolinyl, cinnolinyl, phthalazinyl, quinazolinyl, quinoxalinyl, naphthyridinyl, benzotriazinyl, purinyl, pteridinyl and indolizinyl.

Halogen-substituted radicals, for example haloalkyl, are mono- or polyhalogenated up to the maximum possible number of substituents. In the case of polyhalogenation, the halogen atoms may be the same or different. Halogen is fluorine, chlorine, bromine and iodine, especially fluorine, chlorine and bromine.

Saturated or unsaturated hydrocarbon radicals, such as alkyl or alkenyl, may each be straight-chain or branched if possible, including in combination with heteroatoms, as, for example, in alkoxy.

Optionally substituted radicals may be mono- or polysubstituted, where the substituents in the case of polysubstitution may be the same or different.

The abovementioned general or preferred radical definitions or illustrations can be combined with one another as desired, i.e. including combinations between the respective preferred ranges.

Preference is given in accordance with the invention to compounds of the formula (I) in which a combination of the definitions given above as preferred is present, and every embodiment described above as preferred constitutes an independent combination, in particular a combination as described in Embodiment 2-1 or in Embodiment 2-2 or in Embodiment 2-3.

Particular preference is given in accordance with the invention to compounds of the formula (I) in which a combination of the definitions given above as particularly preferred is present, and every embodiment described above as particularly preferred constitutes an independent combination, in particular a combination as described in Embodiment 3-1 or in Embodiment 3-2 or in Embodiment 3-3 or in Embodiment 3-4 or in Embodiment 3-5 or in Embodiment 3-6.

Very particular preference is given in accordance with the invention to compounds of the formula (I) in which a combination of the definitions given above as very particularly preferred is present, and every embodiment described above as very particularly preferred constitutes an independent combination, in particular a combination as described in Embodiment 4-1 or in Embodiment 4-2 or in Embodiment 4-3 or in Embodiment 4-4 or in Embodiment 4-5 or in Embodiment 4-6.

Depending on the nature of the substituents, the compounds of the formula (I) may be in isomeric form as geometric and/or optical isomers. In this respect, they may be present either in pure form or as mixtures of different possible isomeric forms, especially of stereoisomers, such as E and Z, threo and erythro, and also optical isomers, such as R and S isomers or atropisomers, and, if appropriate, also of tautomers. With respect to the compounds according to the invention, both the E and the Z isomers are claimed, as are the threo and erythro isomers, and also the optical isomers, any mixtures of these isomers, and also the possible tautomeric forms.

In further preferred embodiments, the invention relates to the use of compounds of the formula (I) present as E or Z isomers. This results in the use according to the invention of compounds of the formula (I-Z) or (I-E).

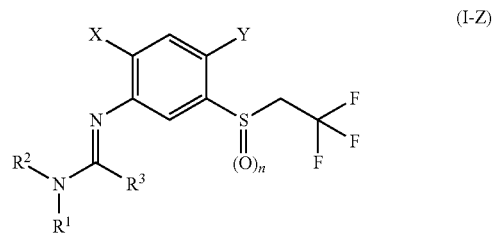

(I-Z)

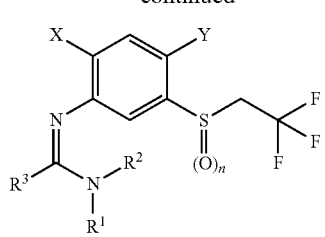

(I-E)

In the compounds of the formula (I) defined by the structures (I-Z) and (I-E), the radicals or structural elements $R^1$, $R^2$, $R^3$, n, Y and X have the meanings described above, in particular as described in Embodiment 1-1.

Preferred from among the compounds of the formula (I) defined by the structures (I-Z) and (I-E) are those compounds in which a combination of the meanings given above as preferred is present, and every embodiment described above as preferred constitutes an independent combination, in particular a combination as described in Embodiment 2-1 or in Embodiment 2-2 or in Embodiment 2-3.

Particularly preferred from among the compounds of the formula (I) defined by the structures (I-Z) and (I-E) are those compounds in which a combination of the meanings given above as particularly preferred is present, and every embodiment described above as particularly preferred constitutes an independent combination, in particular a combination as described in Embodiment 3-1 or in Embodiment 3-2 or in Embodiment 3-3 or in Embodiment 3-4 or in Embodiment 3-5 or in Embodiment 3-6.

Very particularly preferred from among the compounds of the formula (I) defined by the structures (I-Z) and (I-E) are those compounds in which a combination of the meanings given above as very particularly preferred is present, and every embodiment described above as very particularly preferred constitutes an independent combination, in particular a combination as described in Embodiment 4-1 or in Embodiment 4-2 or in Embodiment 4-3 or in Embodiment 4-4 or in Embodiment 4-5 or in Embodiment 4-6.

In further preferred embodiments, the invention relates to the use of compounds of the formula (I) present as optical isomers, in particular of compounds of the formula (I) present as R or S enantiomers with respect to the chiral sulphur atom. Preference is given to using, according to the invention, these optically active stereoisomeric forms of the compounds of the formula (I) and their salts.

An individual configuration of the use according to the invention is therefore directed to the presence of the R enantiomer with respect to the chiral sulphur atom, or to a mixture comprising a majority of the R enantiomer, preferably where the ratio of R to S enantiomer is at least 60:40 and, with increasing preference, at least 70:30, 75:25, 80:20, 85:15 and 90:10.

A further individual configuration of the use according to the invention is therefore directed to the presence of the S enantiomer with respect to the chiral sulphur atom, or to a mixture comprising a majority of the S enantiomer, preferably where the ratio of S to R enantiomer is at least 60:40 and, with increasing preference, at least 70:30, 75:25, 80:20, 85:15 and 90:10.

Very particularly preferred enantiomers are the enantiomers shown below of the compound Ib-14, in particular the R enantiomer thereof (compound (R—)(Ib-17)).

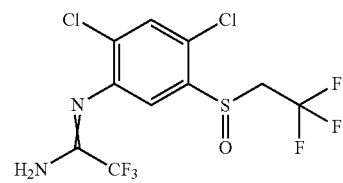

(Ib-14)

(R-)(Ib-17)

(S-)(Ib-17)

Further very particularly preferred enantiomers are the enantiomers shown below of the compound Ib-168, in particular the R enantiomer thereof.

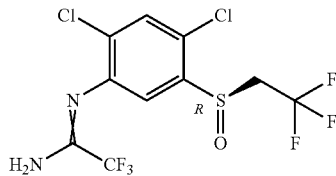

(Ib-168)

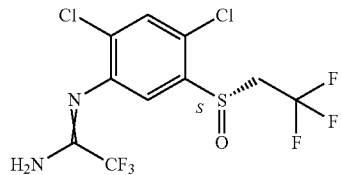

(R-)(Ib-168)

(S-)(Ib-168)

Furthermore, the compounds to be used in accordance with the invention of the formula (I) may be present in various polymorphic forms or as a mixture of various polymorphic forms. Both the pure polymorphs and the polymorph mixtures can be used in accordance with the invention.

The compounds of the formula (I) furthermore also comprise all possible rotamers and mixtures thereof.

The use according to the invention of the compounds of the formula (I) is against a large variety of animal pests, in particular insects, arachnids, helminths, nematodes and molluscs, which are encountered in agriculture, in horticulture, in forests and in gardens and leisure facilities, against normally sensitive and resistant species and against all or some stages of development. These pests include:

pests from the phylum of the Arthropoda, especially from the class of the Arachnida, for example *Acarus* spp., for example *Acarus siro, Aceria kuko, Aceria sheldoni, Aculops* spp., *Aculus* spp., for example *Aculus fockeui, Aculus schlechtendali, Amblyomma* spp., *Amphitetranychus viennensis, Argas* spp., *Boophilus* spp., *Brevipalpus* spp., for example *Brevipalpus phoenicis, Bryobia graminum, Bryobia praetiosa, Centruroides* spp., *Chorioptes* spp., *Dermanyssus gallinae, Dermatophagoides pteronyssinus, Dermatophagoides farinae, Dermacentor* spp., *Eotetranychus* spp., for example *Eotetranychus hicoriae, Epitrimerus pyri, Eutetranychus* spp., for example *Eutetranychus banksi, Eriophyes* spp., for example *Eriophyes pyri, Glycyphagus domesticus, Halotydeus destructor, Hemitarsonemus* spp., for example *Hemitarsonemus latus (=Polyphagotarsonemus latus), Hyalomma* spp., *Ixodes* spp., *Latrodectus* spp., *Loxosceles* spp., *Neutrombicula autumnalis, Nuphersa* spp., *Oligonychus* spp., for example *Oligonychus coniferarum, Oligonychus ilicis, Oligonychus indicus, Oligonychus mangiferus, Oligonychus pratensis, Oligonychus punicae, Oligonychus yothersi, Ornithodorus* spp., *Ornithonyssus* spp., *Panonychus* spp., for example *Panonychus citri (=Metatetranychus citri), Panonychus ulmi (=Metatetranychus ulmi), Phyllocoptruta oleivora, Platytetranychus multidigituli, Polyphagotarsonemus latus, Psoroptes* spp., *Rhipicephalus* spp., *Rhizoglyphus* spp., *Sarcoptes* spp., *Scorpio maurus, Steneotarsonemus* spp., *Steneotarsonemus spinki, Tarsonemus* spp., for example *Tarsonemus confusus, Tarsonemus pallidus, Tetranychus* spp., for example *Tetranychus canadensis, Tetranychus cinnabarinus, Tetranychus turkestani, Tetranychus urticae, Trombicula alfreddugesi, Vaejovis* spp., *Vasates lycopersici;* from the class of the Chilopoda, for example *Geophilus* spp., *Scutigera* spp.;

from the order or the class of the Collembola, for example *Onychiurus armatus; Sminthurus viridis;* from the class of the Diplopoda, for example *Blaniulus guttulatus;* from the class of the Insecta, for example from the order of the Blattodea, for example *Blatta orientalis, Blattella asahinai, Blattella germanica, Leucophaea maderae, Panchlora* spp., *Parcoblatta* spp., *Periplaneta* spp., for example *Periplaneta americana, Periplaneta australasiae, Supella longipalpa;* from the order of the Coleoptera, for example *Acalymma vittatum, Acanthoscelides obtectus, Adoretus* spp., *Agelastica alni, Agriotes* spp., for example *Agriotes linneatus, Agriotes mancus, Alphitobius diaperinus, Amphimallon solstitialis, Anobium punctatum, Anoplophora* spp., *Anthonomus* spp., for example *Anthonomus grandis, Anthrenus* spp., *Apion* spp., *Apogonia* spp., *Atomaria* spp., for example *Atomaria linearis, Attagenus* spp., *Bans caerulescens, Bruchidius obtectus, Bruchus* spp., for example *Bruchus pisorum, Bruchus rufimanus, Cassida* spp., *Cerotoma trifurcata, Ceutorrhynchus* spp., for example *Ceutorrhynchus assimilis, Ceutorrhynchus quadridens, Ceutorrhynchus rapae, Chaetocnema* spp., for example *Chaetocnema confinis, Chaetocnema denticulata, Chaetocnema ectypa, Cleonus mendicus, Conoderus* spp., *Cosmopolites* spp., for example *Cosmopolites sordidus, Costelytra zealandica, Ctenicera* spp., *Curculio* spp., for example *Curculio caryae, Curculio caryatrypes, Curculio obtusus, Curculio sayi, Cryptolestes ferrugineus, Cryptolestes pusillus, Cryptorhynchus lapathi, Cryptorhynchus mangiferae, Cylindrocopturus* spp., *Cylindrocopturus adspersus, Cylindrocopturus furnissi, Dermestes* spp., *Diabrotica* spp., for example *Diabrotica balteata, Diabrotica barberi, Diabrotica undecimpunctata howardi, Diabrotica undecimpunctata undecimpunctata, Diabrotica virgifera virgifera, Diabrotica virgifera zeae, Dichocrocis* spp., *Dicladispa armigera, Diloboderus* spp., *Epilachna* spp., for example *Epilachna borealis, Epilachna varivestis, Epitrix* spp., for example *Epitrix cucumeris, Epitrix fuscula, Epitrix hirtipennis, Epitrix subcrinita, Epitrix tuberis, Faustinus* spp., *Gibbium psylloides, Gnathocerus cornutus, Hellula undalis, Heteronychus arator, Heteronyx* spp., *Hylamorpha elegans, Hylotrupes bajulus, Hypera postica, Hypomeces squamosus, Hypothenemus* spp., for example *Hypothenemus hampei, Hypothenemus obscurus, Hypothenemus pubescens, Lachnosterna consanguinea, Lasioderma serricorne, Latheticus oryzae, Lathridius* spp., *Lema* spp., *Leptinotarsa decemlineata, Leucoptera* spp., for example *Leucoptera coffeella, Lissorhoptrus oryzophilus, Lixus* spp., *Luperomorpha xanthodera, Luperodes* spp., *Lyctus* spp., *Megascelis* spp., *Melanotus* spp., for example *Melanotus longulus oregonensis, Meligethes aeneus, Melolontha* spp., for example *Melolontha melolontha, Migdolus* spp., *Monochamus* spp., *Naupactus xanthographus, Necrobia* spp., *Niptus hololeucus, Oryctes rhinoceros, Oryzaephilus surinamensis, Oryzaphagus oryzae, Otiorhynchus* spp., for example *Otiorhynchus cribricollis, Otiorhynchus ligustici, Otiorhynchus ovatus, Otiorhynchus rugosostriarus, Otiorhynchus sulcatus, Oxycetonia jucunda, Phaedon cochleariae, Phyllophaga* spp., *Phyllophaga helleri, Phyllotreta* spp., for example *Phyllotreta armoraciae, Phyllotreta pusilla, Phyllotreta ramosa, Phyllotreta striolata, Popillia japonica, Premnotrypes* spp., *Prostephanus truncatus, Psylliodes* spp., for example *Psylliodes affinis, Psylliodes chrysocephala, Psylliodes punctulata, Ptinus* spp., *Rhizobius ventralis, Rhizopertha dominica, Sitophilus* spp., for example *Sitophilus granarius, Sitophilus linearis, Sitophilus oryzae, Sitophilus zeamais, Sphenophorus* spp., *Stegobium paniceum, Sternechus* spp., for example *Sternechus paludatus, Symphyletes* spp., *Tanymecus* spp., for example *Tanymecus dilaticollis, Tanymecus indicus, Tanymecus palliatus, Tenebrio molitor, Tenebrioides mauretanicus, Tribolium* spp., for example *Tribolium audax, Tribolium castaneum, Tribolium confusum, Trogoderma* spp., *Tychius* spp., *Xylotrechus* spp., *Zabrus* spp., for example *Zabrus tenebrioides;* from the order of the Diptera, for example *Aedes* spp., for example *Aedes aegypti, Aedes albopictus, Aedes sticticus, Aedes vexans, Agromyza* spp., for example *Agromyza frontella, Agromyza parvicornis, Anastrepha* spp., *Anopheles* spp., for example *Anopheles quadrimaculatus, Anopheles gambiae, Asphondylia* spp., *Bactrocera* spp., for example *Bactrocera cucurbitae, Bactrocera dorsalis, Bactrocera oleae, Bibio hortulanus, Calliphora erythrocephala, Calliphora vicina, Ceratitis capitata, Chironomus* spp., *Chrysomya* spp., *Chrysops* spp., *Chrysozona pluvialis, Cochliomya* spp., *Contarinia* spp., for example *Contarinia johnsoni, Contarinia nasturtii, Contarinia pyrivora, Contarinia schulzi, Contarinia sorghicola, Contarinia tritici, Cordylo-*

*bia anthropophaga, Cricotopus sylvestris, Culex* spp., for example *Culex pipiens, Culex quinquefasciatus, Culicoides* spp., *Culiseta* spp., *Cuterebra* spp., *Dacus oleae, Dasineura* spp., for example *Dasineura brassicae, Delia* spp., for example *Delia antiqua, Delia coarctata, Delia florilega, Delia platura, Delia radicum, Dermatobia hominis, Drosophila* spp., for example *Drosphila melanogaster, Drosophila suzukii, Echinocnemus* spp., *Fannia* spp., *Gasterophilus* spp., *Glossina* spp., *Haematopota* spp., *Hydrellia* spp., *Hydrellia griseola, Hylemya* spp., *Hippobosca* spp., *Hypoderma* spp., *Liriomyza* spp., for example *Liriomyza brassicae, Liriomyza huidobrensis, Liriomyza sativae, Lucilia* spp., for example *Lucilia cuprina, Lutzomyia* spp., *Mansonia* spp., *Musca* spp., for example *Musca domestica, Musca domestica vicina, Oestrus* spp., *Oscinella frit, Paratanytarsus* spp., *Paralauterborniella subcincta, Pegomya* spp., for example *Pegomya betae, Pegomya hyoscyami, Pegomya rubivora, Phlebotomus* spp., *Phorbia* spp., *Phormia* spp., *Piophila casei, Prodiplosis* spp., *Psila rosae, Rhagoletis* spp., for example *Rhagoletis cingulata, Rhagoletis completa, Rhagoletis fausta, Rhagoletis indifferens, Rhagoletis mendax, Rhagoletis pomonella, Sarcophaga* spp., *Simulium* spp., for example *Simulium meridionale, Stomoxys* spp., *Tabanus* spp., *Tetanops* spp., *Tipula* spp., for example *Tipula paludosa, Tipula simplex;* from the order of the Hemiptera, for example *Acizzia acaciaebaileyanae, Acizzia dodonaeae, Acizzia uncatoides, Acrida turrita, Acyrthosipon* spp., for example *Acyrthosiphon pisum, Acrogonia* spp., *Aeneolamia* spp., *Agonoscena* spp., *Aleyrodes proletella, Aleurolobus barodensis, Aleurothrixus floccosus, Allocaridara malayensis, Amrasca* spp., for example *Amrasca bigutulla, Amrasca devastans, Anuraphis cardui, Aonidiella* spp., for example *Aonidiella aurantii, Aonidiella citrina, Aonidiella inornata, Aphanostigma piri, Aphis* spp., for example *Aphis citricola, Aphis craccivora, Aphis fabae, Aphis forbesi, Aphis glycines, Aphis gossypii, Aphis hederae, Aphis illinoisensis, Aphis middletoni, Aphis nasturtii, Aphis nerii, Aphis pomi, Aphis spiraecola, Aphis viburniphila, Arboridia apicalis, Arytainilla* spp., *Aspidiella* spp., *Aspidiotus* spp., for example *Aspidiotus nerii, Atanus* spp., *Aulacorthum solani, Bemisia tabaci, Blastopsylla occidentalis, Boreioglycaspis melaleucae, Brachycaudus helichrysi, Brachycolus* spp., *Brevicoryne brassicae, Cacopsylla* spp., for example *Cacopsylla pyricola, Calligypona marginata, Carneocephala fulgida, Ceratovacuna lanigera, Cercopidae, Ceroplastes* spp., *Chaetosiphon fragaefolii, Chionaspis tegalensis, Chlorita onukii, Chondracris rosea, Chromaphis juglandicola, Chrysomphalus ficus, Cicadulina mbila, Coccomytilus halli, Coccus* spp., for example *Coccus hesperidum, Coccus longulus, Coccus pseudomagnoliarum, Coccus viridis, Cryptomyzus ribis, Cryptoneossa* spp., *Ctenarytaina* spp., *Dalbulus* spp., *Dialeurodes citri, Diaphorina citri, Diaspis* spp., *Drosicha* spp., *Dysaphis* spp., for example *Dysaphis apiifolia, Dysaphis plantaginea, Dysaphis tulipae, Dysmicoccus* spp., *Empoasca* spp., for example *Empoasca abrupta, Empoasca fabae, Empoasca maligna, Empoasca solana, Empoasca stevensi, Eriosoma* spp., for example *Eriosoma americanum, Eriosoma lanigerum, Eriosoma pyricola, Erythroneura* spp., *Eucalyptolyma* spp., *Euphyllura* spp., *Euscelis bilobatus, Ferrisia* spp., *Geococcus coffeae, Glycaspis* spp., *Heteropsylla cubana, Heteropsylla spinulosa, Homalodisca coagulata, Hyalopterus arundinis, Hyalopterus pruni, Icerya* spp., for example *Icerya purchasi, Idiocerus* spp., *Idioscopus* spp., *Laodelphax striatellus, Lecanium* spp., for example *Lecanium corni (=Parthenolecanium corni), Lepidosaphes* spp., for example *Lepidosaphes ulmi, Lipaphis erysimi, Lycorma delicatula, Macrosiphum* spp., for example *Macrosiphum euphorbiae, Macrosiphum lilii, Macrosiphum rosae, Macrosteles facifrons, Mahanarva* spp., *Melanaphis sacchari, Metcalfiella* spp., *Metcalfa pruinosa, Metopolophium dirhodum, Monellia costalis, Monelliopsis pecanis, Myzus* spp., for example *Myzus ascalonicus, Myzus cerasi, Myzus ligustri, Myzus ornatus, Myzus persicae, Myzus nicotianae, Nasonovia ribisnigri, Nephotettix* spp., for example *Nephotettix cincticeps, Nephotettix nigropictus, Nilaparvata lugens, Oncometopia* spp., *Orthezia praelonga, Oxya chinensis, Pachypsylla* spp., *Parabemisia myricae, Paratrioza* spp., for example *Paratrioza cockerelli, Parlatoria* spp., *Pemphigus* spp., for example *Pemphigus bursarius, Pemphigus populivenae, Peregrinus maidis, Phenacoccus* spp., for example *Phenacoccus madeirensis, Phloeomyzus passerinii, Phorodon humuli, Phylloxera* spp., for example *Phylloxera devastatrix, Phylloxera notabilis, Pinnaspis aspidistrae, Planococcus* spp., for example *Planococcus citri, Prosopidopsylla flava, Protopulvinaria pyriformis, Pseudaulacaspis pentagona, Pseudococcus* spp., for example *Pseudococcus calceolariae, Pseudococcus comstocki, Pseudococcus longispinus, Pseudococcus maritimus, Pseudococcus viburni, Psyllopsis* spp., *Psylla* spp., for example *Psylla buxi, Psylla mali, Psylla pyri, Pteromalus* spp., *Pyrilla* spp., *Quadraspidiotus* spp., for example *Quadraspidiotus juglansregiae, Quadraspidiotus ostreaeformis, Quadraspidiotus perniciosus, Quesada gigas, Rastrococcus* spp., *Rhopalosiphum* spp., for example *Rhopalosiphum maidis, Rhopalosiphum oxyacanthae, Rhopalosiphum padi, Rhopalosiphum rufiabdominale, Saissetia* spp., for example *Saissetia coffeae, Saissetia miranda, Saissetia neglecta, Saissetia oleae, Scaphoideus titanus, Schizaphis graminum, Selenaspidus articulatus, Sitobion avenae, Sogata* spp., *Sogatella furcifera, Sogatodes* spp., *Stictocephala festina, Siphoninus phillyreae, Tenalaphara malayensis, Tetragonocephela* spp., *Tinocallis caryaefoliae, Tomaspis* spp., *Toxoptera* spp., for example *Toxoptera aurantii, Toxoptera citricidus, Trialeurodes vaporariorum, Trioza* spp., for example *Trioza diospyri, Typhlocyba* spp., *Unaspis* spp., *Viteus vitifolii, Zygina* spp.;

from the suborder of the Heteroptera, for example *Anasa tristis, Antestiopsis* spp., *Boisea* spp., *Blissus* spp., *Calocoris* spp., *Campylomma livida, Cavelerius* spp., *Cimex* spp., for example *Cimex adjunctus, Cimex hemipterus, Cimex lectularius, Cimex pilosellus, Collaria* spp., *Creontiades dilutus, Dasynus piperis, Dichelops furcatus, Diconocoris hewetti, Dysdercus* spp., *Euschistus* spp., for example *Euschistus heros, Euschistus servus, Euschistus tristigmus, Euschistus variolarius, Eurygaster* spp., *Halyomorpha halys, Heliopeltis* spp., *Horcias nobilellus, Leptocorisa* spp., *Leptocorisa varicornis, Leptoglossus occidentalis, Leptoglossus phyllopus, Lygocoris* spp., for example *Lygocoris pabulinus, Lygus* spp., for example *Lygus elisus, Lygus hesperus, Lygus lineolaris, Macropes excavatus, Monalonion atratum, Nezara* spp., for example *Nezara viridula, Oebalus* spp., *Piesma quadrata, Piezodorus* spp., for example *Piezodorus guildinii, Psallus* spp., *Pseudacysta persea, Rhodnius* spp., *Sahlbergella singularis, Scaptocoris castanea, Scotinophora* spp., *Stephanitis nashi, Tibraca* spp., *Triatoma* spp.;

from the order of the Hymenoptera, for example *Acromyrmex* spp., *Athalia* spp., for example *Athalia rosae, Atta* spp., *Diprion* spp., for example *Diprion similis, Hoplocampa* spp., for example *Hoplocampa cookei, Hoplocampa testudinea, Lasius* spp., *Linepithema humile, Monomorium pharaonis, Sirex* spp., *Solenopsis invicta, Tapinoma* spp., *Urocerus* spp., *Vespa* spp., for example *Vespa crabro, Xeris* spp.;

from the order of the Isopoda, for example *Armadillidium vulgare, Oniscus asellus, Porcellio scaber*;

from the order of the Isoptera, for example *Coptotermes* spp., for example *Coptotermes formosanus, Cornitermes cumulans, Cryptotermes* spp., *Incisitermes* spp., *Microtermes obesi, Odontotermes* spp., *Reticulitermes* spp., for example *Reticulitermes flavipes, Reticulitermes hesperus*;

from the order of the Lepidoptera, for example *Achroia grisella, Acronicta major, Adoxophyes* spp., for example *Adoxophyes orana, Aedia leucomelas, Agrotis* spp., for example *Agrotis segetum, Agrotis ipsilon, Alabama* spp., for example *Alabama argillacea, Amyelois transitella, Anarsia* spp., *Anticarsia* spp., for example *Anticarsia gemmatalis, Argyroploce* spp., *Barathra brassicae, Borbo cinnara, Bucculatrix thurberiella, Bupalus piniarius, Busseola* spp., *Cacoecia* spp., *Caloptilia theivora, Capua reticulana, Carpocapsa pomonella, Carposina niponensis, Cheimatobia brumata, Chilo* spp., for example *Chilo plejadellus, Chilo suppressalis, Choristoneura* spp., *Clysia ambiguella, Cnaphalocerus* spp., *Cnaphalocrocis medinalis, Cnephasia* spp., *Conopomorpha* spp., *Conotrachelus* spp., *Copitarsia* spp., *Cydia* spp., for example *Cydia nigricana, Cydia pomonella, Dalaca noctuides, Diaphania* spp., *Diatraea saccharalis, Earias* spp., *Ecdytolopha aurantium, Elasmopalpus lignosellus, Eldana saccharina, Ephestia* spp., for example *Ephestia elutella, Ephestia kuehniella, Epinotia* spp., *Epiphyas postvittana, Etiella* spp., *Eulia* spp., *Eupoecilia ambiguella, Euproctis* spp., for example *Euproctis chrysorrhoea, Euxoa* spp., *Feltia* spp., *Galleria mellonella, Gracillaria* spp., *Grapholitha* spp., for example *Grapholita molesta, Grapholita prunivora, Hedylepta* spp., *Helicoverpa* spp., for example *Helicoverpa armigera, Helicoverpa zea, Heliothis* spp., for example *Heliothis virescens, Hoftliannophila pseudospretella, Homoeosoma* spp., *Homona* spp., *Hyponomeuta padella, Kakivoria flavofasciata, Laphygma* spp., *Leucinodes orbonalis, Leucoptera* spp., for example *Leucoptera coffeella, Lithocolletis* spp., for example *Lithocolletis blancardella, Lithophane antennata, Lobesia* spp., for example *Lobesia botrana, Loxagrotis albicosta, Lymantria* spp., for example *Lymantria dispar, Lyonetia* spp., for example *Lyonetia clerkella, Malacosoma neustria, Maruca testulalis, Mamestra brassicae, Melanitis leda, Mocis* spp., *Monopis obviella, Mythimna separata, Nemapogon cloacellus, Nymphula* spp., *Oiketicus* spp., *Oria* spp., *Orthaga* spp., *Ostrinia* spp., for example *Ostrinia nubilalis, Oulema melanopus, Oulema oryzae, Panolis flammea, Parnara* spp., *Pectinophora* spp., for example *Pectinophora gossypiella, Perileucoptera* spp., *Phthorimaea* spp., for example *Phthorimaea operculella, Phyllocnistis citrella, Phyllonorycter* spp., for example *Phyllonorycter blancardella, Phyllonorycter crataegella, Pieris* spp., for example *Pieris rapae, Platynota stultana, Plodia interpunctella, Plusia* spp., *Plutella xylostella* (=*Plutella maculipennis*), *Prays* spp., *Prodenia* spp., *Protoparce* spp., *Pseudaletia* spp., for example *Pseudaletia unipuncta, Pseudoplusia includens, Pyrausta nubilalis, Rachiplusia nu, Schoenobius* spp., for example *Schoenobius bipunctifer, Scirpophaga* spp., for example *Scirpophaga innotata, Scotia segetum, Sesamia* spp., for example *Sesamia inferens, Sparganothis* spp., *Spodoptera* spp., for example *Spodoptera eradiana, Spodoptera exigua, Spodoptera frugiperda, Spodoptera praefica, Stathmopoda* spp., *Stomopteryx subsecivella, Synanthedon* spp., *Tecia solanivora, Thermesia gemmatalis, Tinea cloacella, Tinea pellionella, Tineola bisselliella, Tortrix* spp., *Trichophaga tapetzella, Trichoplusia* spp., for example *Trichoplusia ni, Tryporyza incertulas, Tuta absoluta, Virachola* spp.;

from the order of the Orthoptera or Saltatoria, for example *Acheta domesticus, Dichroplus* spp., *Gryllotalpa* spp., for example *Gryllotalpa gryllotalpa, Hieroglyphus* spp., *Locusta* spp., for example *Locusta migratoria, Melanoplus* spp., for example *Melanoplus devastator, Paratlanticus ussuriensis, Schistocerca gregaria*;

from the order of the Phthiraptera, for example *Damalinia* spp., *Haematopinus* spp., *Linognathus* spp., *Pediculus* spp., *Phylloxera vastatrix, Phthirus pubis, Trichodectes* spp.;

from the order of the Psocoptera, for example *Lepinotus* spp., *Liposcelis* spp.;

from the order of the Siphonaptera, for example, *Ceratophyllus* spp., *Ctenocephalides* spp., for example *Ctenocephalides canis, Ctenocephalides felis, Pulex irritans, Tunga penetrans, Xenopsylla cheopis*;

from the order of the Thysanoptera, for example *Anaphothrips obscurus, Baliothrips biformis, Drepanothrips reuteri, Enneothrips flavens, Frankliniella* spp., for example *Frankliniella fusca, Frankliniella occidentalis, Frankliniella schultzei, Frankliniella tritici, Frankliniella vaccinii, Frankliniella williamsi, Heliothrips* spp., *Hercinothrips femoralis, Rhipiphorothrips cruentatus, Scirtothrips* spp., *Taeniothrips cardamomi, Thrips* spp., for example *Thrips palmi, Thrips tabaci*;

from the order of the Zygentoma (=Thysanura), for example *Ctenolepisma* spp., *Lepisma saccharina, Lepismodes inquilinus, Thermobia domestica*;

from the class of the Symphyla, for example *Scutigerella* spp., for example *Scutigerella immaculata*;

pests from the phylum of the Mollusca, in particular from the class of the Bivalvia, for example *Dreissena* spp.;

and also from the class of the Gastropoda, for example Anon spp., for example Anon ater *rufus, Biomphalaria* spp., *Bulinus* spp., *Deroceras* spp., for example *Deroceras laeve, Galba* spp., *Lymnaea* spp., *Oncomelania* spp., *Pomacea* spp., *Succinea* spp.;

animal and human parasites from the phyla of the Platyhelminthes and Nematoda, for example *Aelurostrongylus* spp., *Amidostomum* spp., *Ancylostoma* spp, *Angiostrongylus* spp., *Anisakis* spp., *Anoplocephala* spp., *Ascaris* spp., *Ascaridia* spp., *Baylisascaris* spp., *Brugia* spp., *Bunostomum* spp., *Capillaria* spp., *Chabertia* spp., *Clonorchis* spp., *Cooperia* spp., *Crenosoma* spp., *Cyathostoma* spp., *Dicrocoelium* spp., *Dictyocaulus* spp., *Diphyllobothrium* spp., *Dipylidium* spp., *Dirofilaria* spp., *Dracunculus* spp., *Echinococcus* spp., *Echinostoma* spp., *Enterobius* spp., *Eucoleus* spp., *Fasciola* spp., *Fascioloides* spp., *Fasciolopsis* spp., *Filaroides* spp., *Gongylonema* spp., *Gyrodactylus* spp., *Habronema* spp., *Haemonchus* spp., *Heligmosomoides* spp., *Heterakis* spp., *Hymenolepis* spp., *Hyostrongylus* spp., *Litomosoides* spp., *Loa* spp., *Metastrongylus* spp., *Metorchis* spp., *Mesocestoides* spp., *Moniezia* spp., *Muellerius* spp., *Necator* spp., *Nematodirus* spp., *Nippostrongylus* spp., *Oesophagostomum* spp., *Ollulanus* spp., *Onchocerca* spp, *Opisthorchis* spp., *Oslerus* spp., *Ostertagia* spp., *Oxyuris* spp., *Paracapillaria* spp., *Parafilaria* spp., *Paragonimus* spp., *Paramphistomum* spp., *Paranoplocephala* spp., *Parascaris* spp., *Passalurus* spp., *Protostrongylus* spp., *Schistosoma* spp., *Setaria* spp., *Spirocerca* spp., *Stephanofilaria* spp., *Stephanurus* spp., *Strongyloides* spp., *Strongylus* spp., *Syngamus* spp., *Taenia* spp., *Teladorsagia* spp., *Thelazia* spp., *Toxascaris* spp., *Toxocara* spp., *Trichinella* spp., *Trichobilharzia* spp., *Trichostrongylus* spp., *Trichuris* spp., *Uncinaria* spp., *Wuchereria* spp.;

plant pests from the phylum of the Nematoda, i.e. phytoparasitic nematodes, especially *Aglenchus* spp., for example *Aglenchus agricola, Anguina* spp., for example

*Anguina tritici, Aphelenchoides* spp., for example *Aphelenchoides arachidis, Aphelenchoides fragariae, Belonolaimus* spp., for example *Belonolaimus gracilis, Belonolaimus longicaudatus, Belonolaimus nortoni, Bursaphelenchus* spp., for example *Bursaphelenchus cocophilus, Bursaphelenchus eremus, Bursaphelenchus xylophilus, Cacopaurus* spp., for example *Cacopaurus pestis, Criconemella* spp., for example *Criconemella curvata, Criconemella onoensis, Criconemella ornata, Criconemella rusium, Criconemella xenoplax* (=*Mesocriconema xenoplax*), *Criconemoides* spp., for example *Criconemoides ferniae, Criconemoides onoense, Criconemoides ornatum, Ditylenchus* spp., for example *Ditylenchus dipsaci, Dolichodorus* spp., *Globodera* spp., for example *Globodera pallida, Globodera rostochiensis, Helicotylenchus* spp., for example *Helicotylenchus dihystera, Hemicriconemoides* spp., *Hemicycliophora* spp., *Heterodera* spp., for example *Heterodera avenae, Heterodera glycines, Heterodera schachtii, Hoplolaimus* spp., *Longidorus* spp., for example *Longidorus africanus, Meloidogyne* spp., for example *Meloidogyne chitwoodi, Meloidogyne fallax, Meloidogyne hapla, Meloidogyne incognita, Meloinema* spp., *Nacobbus* spp., *Neotylenchus* spp., *Paraphelenchus* spp., *Paratrichodorus* spp., for example *Paratrichodorus minor, Pratylenchus* spp., for example *Pratylenchus penetrans, Pseudohalenchus* spp., *Psilenchus* spp., *Punctodera* spp., *Quinisulcius* spp., *Radopholus* spp., for example *Radopholus citrophilus, Radopholus similis, Rotylenchulus* spp., *Rotylenchus* spp., *Scutellonema* spp., *Subanguina* spp., *Trichodorus* spp., for example *Trichodorus obtusus, Trichodorus primitivus, Tylenchorhynchus* spp., for example *Tylenchorhynchus annulatus, Tylenchulus* spp., for example *Tylenchulus semipenetrans, Xiphinema* spp., for example *Xiphinema index.*

In addition, it is possible to control, from the sub-kingdom of the Protozoa, the order of the Coccidia, for example *Eimeria* spp.

The compounds of the formula (I) can optionally, at certain concentrations or application rates, also be used as herbicides, safeners, growth regulators or agents to improve plant properties, as microbicides or gametocides, for example as fungicides, antimycotics, bactericides, virucides (including agents against viroids) or as agents against MLO (mycoplasma-like organisms) and RLO (rickettsia-like organisms).

Formulations

In the context of formulations and application forms prepared therefrom, compounds of the formula (I) can be used as pesticides, for example as drench, drip and spray liquors comprising the compound of the formula (I). In some cases, the use forms comprise further pesticides and/or adjuvants which improve action, such as penetrants, e.g. vegetable oils, for example rapeseed oil, sunflower oil, mineral oils, for example paraffin oils, alkyl esters of vegetable fatty acids, for example rapeseed oil methyl ester or soya oil methyl ester, or alkanol alkoxylates and/or spreaders, for example alkylsiloxanes and/or salts, for example organic or inorganic ammonium or phosphonium salts, for example ammonium sulphate or diammonium hydrogenphosphate and/or retention promoters, for example dioctyl sulphosuccinate or hydroxypropylguar polymers and/or humectants, for example glycerol and/or fertilizers, for example ammonium-, potassium- or phosphorus-containing fertilizers.

Customary formulations are, for example, water-soluble liquids (SL), emulsion concentrates (EC), emulsions in water (EW), suspension concentrates (SC, SE, FS, OD), water-dispersible granules (WG), granules (GR) and capsule concentrates (CS); these and further possible formulation types are described, for example, by Crop Life International and in Pesticide Specifications, Manual on development and use of FAO and WHO specifications for pesticides, FAO Plant Production and Protection Papers—173, prepared by the FAO/WHO Joint Meeting on Pesticide Specifications, 2004, ISBN: 9251048576. The formulations, in addition to one or more compounds of the formula (I), optionally comprise further agrochemically active compounds.

These are preferably formulations or use forms which comprise auxiliaries, for example extenders, solvents, spontaneity promoters, carriers, emulsifiers, dispersants, frost protectants, biocides, thickeners and/or further auxiliaries, for example adjuvants. An adjuvant in this context is a component which improves the biological activity of the formulation without having biological activity itself. Examples of adjuvants are agents which promote retention, the spreading characteristics, adhesion to the leaf surface or penetration.

These formulations are prepared in a known way, for example by mixing the compound of the formula (I) with auxiliaries, for example extenders, solvents and/or solid carriers and/or other auxiliaries, for example surfactants. The formulations are produced either in suitable facilities or else before or during application.

The auxiliaries used may be such substances suitable for imparting special properties, such as certain physical, technical and/or biological properties, to the formulation of the compound of the formula (I), or to the use forms prepared from these formulations (for example ready-to-use pesticides such as spray liquors or seed dressing products).

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), esters (including fats and oils) and (poly)ethers, the unsubstituted and substituted amines, amides, lactams (such as N-alkylpyrrolidones) and lactones, the sulphones and sulphoxides (such as dimethyl sulphoxide).

If the extender utilized is water, it is also possible to use, for example, organic solvents as auxiliary solvents. Useful liquid solvents essentially include: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide and dimethyl sulphoxide, and also water.

In principle, it is possible to use any suitable solvents. Examples of suitable solvents are aromatic hydrocarbons, such as xylene, toluene or alkylnaphthalenes, chlorinated aromatic or aliphatic hydrocarbons, such as chlorobenzene, chloroethylene or methylene chloride, aliphatic hydrocarbons, such as cyclohexane, paraffins, mineral oil fractions, mineral and vegetable oils, alcohols, such as methanol, ethanol, isopropanol, butanol or glycol and their ethers and esters, ketones such as acetone, methyl ethyl ketone, methyl isobutyl ketone or cyclohexanone, strongly polar solvents, such as dimethyl sulphoxide, and also water.

In principle, it is possible to use all suitable carriers. Useful carriers especially include: for example ammonium salts and ground natural minerals such as kaolins, clays, talc, chalk, quartz, attapulgite, montmorillonite or diatomaceous earth, and ground synthetic minerals such as finely divided silica, alumina and natural or synthetic silicates, resins, waxes and/or solid fertilizers. Mixtures of such carriers can likewise be used. Useful carriers for granules include: for example crushed and fractionated natural rocks such as calcite, marble, pumice, sepiolite, dolomite, and synthetic granules of inorganic and organic flours, and also granules of organic material such as sawdust, paper, coconut shells, corn cobs and tobacco stalks.

It is also possible to use liquefied gaseous extenders or solvents. Especially suitable are those extenders or carriers which are gaseous at standard temperature and under standard pressure, for example aerosol propellants such as halohydrocarbons, and also butane, propane, nitrogen and carbon dioxide.

Examples of emulsifiers and/or foam formers, dispersants or wetting agents having ionic or nonionic properties or mixtures of these surface-active substances are salts of polyacrylic acid, salts of lignosulphonic acid, salts of phenolsulphonic acid or naphthalenesulphonic acid, polycondensates of ethylene oxide with fatty alcohols or with fatty acids or with fatty amines, with substituted phenols (preferably alkylphenols or arylphenols), salts of sulphosuccinic esters, taurine derivatives (preferably alkyl taurates), phosphoric esters of polyethoxylated alcohols or phenols, fatty acid esters of polyols, and derivatives of the compounds containing sulphates, sulphonates and phosphates, for example alkylaryl polyglycol ethers, alkylsulphonates, alkyl sulphates, arylsulphonates, protein hydrolysates, lignosulphite waste liquors and methylcellulose. The presence of a surfactant is advantageous when one of the compounds of the formula (I) and/or one of the inert carriers is insoluble in water and when the application takes place in water.

Further auxiliaries which may be present in the formulations and the use forms derived therefrom are dyes such as inorganic pigments, for example iron oxide, titanium oxide and Prussian Blue, and organic dyes such as alizarin dyes, azo dyes and metal phthalocyanine dyes, and nutrients and trace nutrients such as salts of iron, manganese, boron, copper, cobalt, molybdenum and zinc.

In addition, stabilizers, such as low-temperature stabilizers, preservatives, antioxidants, light stabilizers or other agents which improve chemical and/or physical stability, may be present. In addition, foam formers or antifoams may be present.

In addition, the formulations and use forms derived therefrom may also comprise, as additional auxiliaries, stickers such as carboxymethyl cellulose and natural and synthetic polymers in the form of powders, granules or latices, such as gum arabic, polyvinyl alcohol and polyvinyl acetate, and also natural phospholipids such as cephalins and lecithins and synthetic phospholipids. Further possible auxiliaries are mineral and vegetable oils.

Optionally, yet further auxiliaries may be present in the formulations and the use forms derived therefrom. Examples of such additives are fragrances, protective colloids, binders, adhesives, thickeners, thixotropic agents, penetrants, retention promoters, stabilizers, sequestrants, complexing agents, humectants, spreaders. In general, the compounds of the formula (I) can be combined with any solid or liquid additive commonly used for formulation purposes.

Useful retention promoters include all those substances which reduce dynamic surface tension, for example dioctyl sulphosuccinate, or increase viscoelasticity, for example hydroxypropylguar polymers.

Useful penetrants in the present context are all those substances which are typically used to improve the penetration of active agrochemical compounds into plants. Penetrants are defined in this context by their ability to penetrate from the (generally aqueous) application liquor and/or from the spray coating into the cuticle of the plant and hence increase the mobility of the active compounds in the cuticle. The method described in the literature (Baur et al., 1997, Pesticide Science 51, 131-152) can be used for determining this property. Examples include alcohol alkoxylates, for example coconut fatty ethoxylate (10) or isotridecyl ethoxylate (12), fatty acid esters, for example rapeseed oil methyl ester or soya oil methyl ester, fatty amine alkoxylates, for example tallowamine ethoxylate (15), or ammonium and/or phosphonium salts, for example ammonium sulphate or diammonium hydrogenphosphate.

The formulations preferably comprise between 0.00000001% and 98% by weight of the compound of the formula (I), more preferably between 0.01% and 95% by weight of the compound of the formula (I), most preferably between 0.5% and 90% by weight of the compound of the formula (I), based on the weight of the formulation.

The content of the compound of the formula (I) in the use forms prepared from the formulations (in particular pesticides) may vary within wide ranges. The concentration of the compound of the formula (I) in the use forms may typically be between 0.00000001% and 95% by weight of the compound of the formula (I), preferably between 0.00001% and 1% by weight, based on the weight of the use form. Application is accomplished in a customary manner appropriate for the use forms.

Plants and Plant Parts

According to the invention, it is possible to treat all plants and plant parts suitable for the intended application forms. Plants are understood here to mean all plants and populations of plants, such as desirable and undesirable wild plants or crop plants (including naturally occurring crop plants), for example cereals (wheat, rice, triticale, barley, rye, oats), maize, soya beans, potatoes, sugar beet, sugar cane, tomatoes, peas and other types of vegetable, cotton, tobacco, oilseed rape, and also fruit plants (with the fruits apples, pears, citrus fruits and grapevines). Crop plants may be plants which can be obtained by conventional breeding and optimization methods or by biotechnological and genetic engineering methods or combinations of these methods, including the transgenic plants and including the plant cultivars which are protectable or non-protectable by plant breeders' rights. Parts of plants shall be understood to mean all parts and organs of the plants above and below ground, such as shoot, leaf, flower and root, examples given being leaves, needles, stalks, stems, flowers, fruit bodies, fruits and seeds, and also roots, tubers and rhizomes. Parts of plants also include harvested material and vegetative and generative propagation material, for example cuttings, tubers, rhizomes, slips and seeds.

As already mentioned above, it is possible to treat all plants and parts thereof in accordance with the invention. In a preferred embodiment, wild plant species and plant cultivars, or those obtained by conventional biological breeding methods, such as crossing or protoplast fusion, and parts thereof, are treated. In a further preferred embodiment, transgenic plants and plant cultivars obtained by genetic engineering methods, if appropriate in combination with conventional methods (genetically modified organisms), and parts thereof are treated. The term "parts" or "parts of plants" or "plant parts" has been explained above. Particular preference is given in accordance with the invention to treating plants of the respective commercially customary plant cultivars or those that are in use. Plant cultivars are understood to mean plants having new properties ("traits") and which have been grown by conventional breeding, by mutagenesis or by recombinant DNA techniques. They may be cultivars, varieties, biotypes or genotypes.

Transgenic Plants, Seed Treatment and Integration Events

The preferred transgenic plants or plant cultivars (those obtained by genetic engineering) which are to be treated in accordance with the invention include all plants which, through the genetic modification, received genetic material which imparts particular advantageous useful properties ("traits") to these plants. Examples of such properties are better plant growth, increased tolerance to high or low temperatures, increased tolerance to drought or to levels of water or soil salinity, enhanced flowering performance, easier harvesting, accelerated ripening, higher yields, higher quality and/or higher nutritional value of the harvested products, better storage life and/or processibility of the harvested products. Further and particularly emphasized examples of such properties are increased resistance of the plants against animal and microbial pests, such as insects, arachnids, nematodes, mites, slugs and snails owing, for example, to toxins formed in the plants, in particular those produced in the plants by the genetic material from *Bacillus thuringiensis* (for example by the genes CryIA(a), CryIA(b), CryIA(c), CryIIA, CryIIIA, CryIIIB2, Cry9c Cry2Ab, Cry3Bb and CryIF and also combinations thereof), and also increased resistance of the plants against phytopathogenic fungi, bacteria and/or viruses caused, for example, by systemic acquired resistance (SAR), systemin, phytoalexins, elicitors and resistance genes and correspondingly expressed proteins and toxins, and also increased tolerance of the plants to certain herbicidally active ingredients, for example imidazolinones, sulphonylureas, glyphosates or phosphinothricin (for example the "PAT" gene). The genes which impart the desired properties ("traits") in question may also be present in combinations with one another in the transgenic plants. Examples of transgenic plants include the important crop plants, such as cereals (wheat, rice, triticale, barley, rye, oats), maize, soya beans, potatoes, sugar beet, sugar cane, tomatoes, peas and other types of vegetable, cotton, tobacco, oilseed rape and also fruit plants (with the fruits apples, pears, citrus fruits and grapevines), particular emphasis being given to maize, soya beans, wheat, rice, potatoes, cotton, sugar cane, tobacco and oilseed rape. Properties ("traits") which are particularly emphasized are the increased resistance of the plants to insects, arachnids, nematodes and slugs and snails.

Crop Protection—Types of Treatment

The treatment of the plants and plant parts with the compounds of the formula (I) is effected directly or by action on their surroundings, habitat or storage space by the intended treatment methods, for example by dipping, injecting (into the soil), watering (drenching), drip irrigating and, in the case of propagation material, especially in the case of seed, also by dry seed treatment, wet seed treatment, slurry treatment, incrustation, coating with one or more coats, etc.

In the case of systemically active compounds, the compounds of the formula (I) also access the plants via the root system. The plants are then treated by the action of the compounds of the formula (I) on the habitat of the plant. This can be accomplished, for example, by drenching, or by mixing into the soil or the nutrient solution, meaning that the locus of the plant (e.g. soil or hydroponic systems) is impregnated with a liquid form of the compounds of the formula (I), or by soil application, meaning that the compounds of the formula (I) are introduced in solid form (e.g. in the form of granules) into the locus of the plants. In the case of paddy rice crops, this can also be accomplished by metering the compound of the formula (I) in a solid application form (for example as granules) into a flooded paddy field.

Seed Treatment

The control of animal pests by the treatment of the seed of plants has long been known and is the subject of constant improvements. However, the treatment of seed entails a series of problems which cannot always be solved in a satisfactory manner. Thus, it is desirable to develop methods for protecting the seed and the germinating plant which dispense with, or at least reduce considerably, the additional application of pesticides during storage, after sowing or after emergence of the plants. It is additionally desirable to optimize the amount of active compound used so as to provide optimum protection for the seed and the germinating plant from attack by animal pests, but without damage to the plant itself by the active compound used. In particular, methods for the treatment of seed should also take account of the intrinsic insecticidal or nematicidal properties of pest-resistant or -tolerant transgenic plants in order to achieve optimal protection of the seed and the germinating plant with a minimum expenditure of pesticides.

The present invention likewise relates to the use of the compounds of the formula (I) for the treatment of seed for protecting the seed and the resulting plant from animal pests.

One of the advantages that occurs when one of the compounds of the formula (I) acts systemically is that the treatment of the seed protects not just the seed itself but also the plants resulting therefrom after emergence against animal pests. In this way, the immediate treatment of the crop at the time of sowing or shortly thereafter can be dispensed with.

A further advantage is that the treatment of the seed with a compound of the formula (I) can enhance germination and emergence of the treated seed.

It is likewise considered to be advantageous that compounds of the formula (I) can especially also be used for transgenic seed.

In addition, compounds of the formula (I) can be used in combination with signalling technology compositions, which results in better colonization by symbionts, for example *rhizobia*, mycorrhizae and/or endophytic bacteria or fungi, and/or leads to optimized nitrogen fixation.

The compounds of the formula (I) are suitable for protection of seed of any plant variety which is used in agriculture, in greenhouses, in forests or in horticulture. More particularly, this is the seed of cereals (for example wheat, barley, rye, millet and oats), maize, cotton, soya beans, rice, potatoes, sunflowers, coffee, tobacco, canola, oilseed rape, beets (for example sugar beets and fodder beets), peanuts, vegetables (for example tomatoes, cucumbers, beans, cruciferous vegetables, onions and lettuce), fruit plants, lawns and ornamental plants. Of particular significance is the treatment of the seed of cereals (such as wheat, barley, rye and oats), maize, soya beans, cotton, canola, oilseed rape and rice.

As already mentioned above, the treatment of transgenic seed with a compound of the formula (I) is also of particular importance. This involves the seed of plants which generally contain at least one heterologous gene which controls the expression of a polypeptide having insecticidal and/or nematicidal properties in particular. The heterologous genes in transgenic seed may originate from microorganisms such as *Bacillus, Rhizobium, Pseudomonas, Serratia, Trichoderma,*

*Clavibacter, Glomus* or *Gliocladium*. The present invention is particularly suitable for the treatment of transgenic seed containing at least one heterologous gene originating from *Bacillus* sp. The heterologous gene is more preferably derived from *Bacillus thuringiensis*.

In the context of the present invention, the compound of the formula (I) is applied to the seed. The seed is preferably treated in a state in which it is sufficiently stable for no damage to occur in the course of treatment. In general, the seed can be treated at any time between harvest and sowing. It is customary to use seed which has been separated from the plant and freed from cobs, shells, stalks, coats, hairs or the flesh of the fruits. Thus, for example, it is possible to use seed which has been harvested, cleaned and dried down to a moisture content which allows storage. Alternatively, it is also possible to use seed which, after drying, has been treated with, for example, water and then dried again, for example priming. In the case of rice seed, it is also possible to use seed which, for example, has been pre-swollen in water up to a particular stage (pigeon breast stage), which leads to better germination and to more homogeneous emergence.

When treating the seed, care must generally be taken that the amount of the compound of the formula (I) applied to the seed and/or the amount of further additives is chosen in such a way that the germination of the seed is not adversely affected, or that the resulting plant is not damaged. This has to be ensured particularly in the case of active compounds which can exhibit phytotoxic effects at certain application rates.

In general, the compounds of the formula (I) are applied to the seed in the form of a suitable formulation. Suitable formulations and processes for seed treatment are known to the person skilled in the art.

The compounds of the formula (I) can be converted to the customary seed dressing formulations, such as solutions, emulsions, suspensions, powders, foams, slurries or other coating compositions for seed, and also ULV formulations.

These formulations are produced in a known manner, by mixing compounds of the formula (I) with customary additives, for example customary extenders and solvents or diluents, dyes, wetters, dispersants, emulsifiers, antifoams, preservatives, secondary thickeners, stickers, gibberellins and also water.

Useful dyes which may be present in the seed dressing formulations usable in accordance with the invention are all dyes which are customary for such purposes. It is possible to use either pigments, which are sparingly soluble in water, or dyes, which are soluble in water. Examples include the dyes known by the names Rhodamine B, C.I. Pigment Red 112 and C.I. Solvent Red 1.

Useful wetting agents which may be present in the seed dressing formulations usable in accordance with the invention are all substances which promote wetting and which are customary for the formulation of active agrochemical compounds. Preference is given to using alkyl naphthalenesulphonates, such as diisopropyl or diisobutyl naphthalenesulphonates.

Suitable dispersants and/or emulsifiers which may be present in the seed-dressing formulations usable in accordance with the invention are all nonionic, anionic and cationic dispersants customary for the formulation of active agrochemical compounds. Preference is given to using nonionic or anionic dispersants or mixtures of nonionic or anionic dispersants. Suitable nonionic dispersants include in particular ethylene oxide/propylene oxide block polymers, alkylphenol polyglycol ethers and tristryrylphenol polyglycol ethers, and the phosphated or sulphated derivatives thereof. Suitable anionic dispersants are especially lignosulphonates, polyacrylic acid salts and arylsulphonate/formaldehyde condensates.

Antifoams which may be present in the seed dressing formulations usable in accordance with the invention are all foam-inhibiting substances customary for the formulation of active agrochemical compounds. Silicone antifoams and magnesium stearate can be used with preference.

Preservatives which may be present in the seed-dressing formulations usable in accordance with the invention are all substances usable for such purposes in agrochemical compositions. Examples include dichlorophene and benzyl alcohol hemiformal.

Secondary thickeners which may be present in the seed dressing formulations usable in accordance with the invention are all substances which can be used for such purposes in agrochemical compositions. Preferred examples include cellulose derivatives, acrylic acid derivatives, xanthan, modified clays and finely divided silica.

Useful stickers which may be present in the seed dressing formulations usable in accordance with the invention are all customary binders usable in seed dressing products. Preferred examples include polyvinylpyrrolidone, polyvinyl acetate, polyvinyl alcohol and tylose.

Gibberellins which may be present in the seed dressing formulations usable in accordance with the invention are preferably the gibberellins A1, A3 (=gibberellic acid), A4 and A7; particular preference is given to using gibberellic acid. The gibberellins are known (cf. R. Wegler "Chemie der Pflanzenschutz- and Schädlingsbekämpfungsmittel", vol. 2, Springer Verlag, 1970, pp. 401-412).

The seed-dressing formulations usable in accordance with the invention can be used to treat a wide variety of different kinds of seed, either directly or after prior dilution with water. For instance, the concentrates or the preparations obtainable therefrom by dilution with water can be used to dress the seed of cereals, such as wheat, barley, rye, oats, and triticale, and also the seed of maize, rice, oilseed rape, peas, beans, cotton, sunflowers, soya beans and beets, or else a wide variety of different vegetable seed. The seed dressing formulations usable in accordance with the invention, or the dilute use forms thereof, can also be used to dress seed of transgenic plants.

For the treatment of seed with the seed dressing formulations usable in accordance with the invention, or use forms prepared therefrom, all mixing units usable customarily for the seed dressing are useful. Specifically, the procedure in seed dressing is to place the seed into a mixer in batchwise or continuous operation, to add the particular desired amount of seed dressing formulations, either as such or after prior dilution with water, and to mix until the formulation is distributed homogeneously on the seed. If appropriate, this is followed by a drying operation.

The application rate of the seed dressing formulations usable in accordance with the invention can be varied within a relatively wide range. It is guided by the particular content of the compounds of the formula (I) in the formulations and by the seed. The application rates of the compound of the formula (I) are generally between 0.001 and 50 g per kilogram of seed, preferably between 0.01 and 15 g per kilogram of seed.

USE EXAMPLES

The examples which follow illustrate the invention without limiting it in any way.

*Tetranychus urticae*—Drench Test, OP-Resistant (TETRUR)

Solvent: 7 parts by weight of dimethylformamide
Emulsifier: 2 parts by weight of alkylaryl polyglycol ether To produce a suitable active compound preparation, 1 part by weight of active compound was mixed with the specified amounts of solvent and emulsifier, and the concentrate was diluted with water to the desired concentration, with the volume of soil which was drenched being taken into account. It was ensured that a concentration of 40 ppm of emulsifier in the soil was not exceeded. To produce further test concentrations, water was used for dilution.

Bean plants (*Phaseolus vulgaris*), in soil pots, which were heavily infested by all stages of the greenhouse red spider mite (*Tetranychus urticae*) were watered with an active compound preparation of the desired concentration.

After the desired period of time, the efficacy in % was determined. 100% means that all the spider mites have been killed; 0% means that no spider mites have been killed. The results are shown in Table 1 ("TETRUR DRENCH").

For comparison, a spray test was also carried out, as described below.

*Tetranychus urticae*—Spray Test; OP-Resistant (TETRUR)

Solvent: 7 parts by weight of dimethylformamide
Emulsifier: alkylaryl polyglycol ether To produce a suitable active compound preparation, 1 part by weight of active compound was dissolved using the stated parts by weight of solvent and made up with water containing an emulsifier concentration of 1000 ppm until the desired concentration was attained. To produce further test concentrations, the preparation was diluted with emulsifier-containing water. Ammonium salts and penetrants (rapeseed oil methyl ester) were each added in a concentration of 1000 ppm to the solution of the preparations.

Bean plants (*Phaseolus vulgaris*) which were heavily infested by all stages of the greenhouse red spider mite (*Tetranychus urticae*) were sprayed with an active compound preparation of the desired concentration.

After the desired period of time, the efficacy in % was determined. 100% means that all the spider mites have been killed; 0% means that no spider mites have been killed. The results are shown in Table 1 ("TETRUR SPRAY").

TABLE 1

| Compound | Structure | Test | Concentration in ppm | % effect after 14 d |
|---|---|---|---|---|
| Ib-17 | Chiral | TETRUR DRENCH | 0.8 | 100 |
|  |  | TETRUR DRENCH | 0.16 | 98 |
|  |  | TETRUR SPRAY | 0.8 | 98 |
|  |  | TETRUR SPRAY | 0.16 | 0 |
| Ib-21 |  | TETRUR DRENCH | 0.8 | 95 |
|  |  | TETRUR DRENCH | 0.16 | 80 |
|  |  | TETRUR SPRAY | 0.8 | 90 |
|  |  | TETRUR SPRAY | 0.16 | 0 |
| Ib-14 |  | TETRUR DRENCH | 0.16 | 80 |
|  |  | TETRUR SPRAY | 0.16 | 0 |
| Ib-68 |  | TETRUR DRENCH | 0.8 | 100 |
|  |  | TETRUR DRENCH | 0.16 | 98 |
|  |  | TETRUR SPRAY | 0.8 | 80 |
|  |  | TETRUR SPRAY | 0.16 | 0 |

TABLE 1-continued

| Compound | Structure | Test | Concentration in ppm | % effect after 14 d |
|---|---|---|---|---|
| Ib-57 | | TETRUR DRENCH | 0.16 | 90 |
| | | TETRUR SPRAY | 0.16 | 0 |
| Ib-26 | | TETRUR DRENCH | 0.8 | 95 |
| | | TETRUR SPRAY | 0.8 | 0 |
| Ib-19 | | TETRUR | 0.8 | 98 |
| | | DRENCH | 0.16 | 98 |
| | | TETRUR | 0.8 | 30 |
| | | SPRAY | 0.16 | 0 |
| Ib-33 | | TETRUR | 0.8 | 95 |
| | | DRENCH | 0.16 | 60 |
| | | TETRUR | 0.8 | 0 |
| | | SPRAY | 0.16 | 0 |
| Ib-62 | | TETRUR | 4 | 90 |
| | | DRENCH | 0.8 | 90 |
| | | TETRUR | 4 | 0 |
| | | SPRAY | 0.8 | 0 |
| Ib-115 | | TETRUR | 4 | 90 |
| | | DRENCH | 0.8 | 90 |
| | | TETRUR | 4 | 0 |
| | | SPRAY | 0.8 | 0 |

TABLE 1-continued

| Compound | Structure | Test | Concentration in ppm | % effect after 14 d |
|---|---|---|---|---|
| Ib-168 | | TETRUR | 0.8 | 95 |
| | | DRENCH | 0.16 | 50 |
| | | TETRUR | 0.8 | 30 |
| | | SPRAY | 0.16 | 0 |
| Ib-01 | | TETRUR | 4 | 100 |
| | | DRENCH | 0.8 | 100 |
| | | TETRUR | 4 | 98 |
| | | SPRÜH | 0.8 | 0 |
| Ib-11 | | TETRUR | 4 | 100 |
| | | DRENCH | 0.8 | 100 |
| | | TETRUR | 4 | 95 |
| | | SPRÜH | 0.8 | 50 |
| Ib-16 | | TETRUR | 0.8 | 100 |
| | | DRENCH | 0.16 | 99 |
| | | TETRUR | 0.8 | 40 |
| | | SPRÜH | 0.16 | 0 |
| Ib-18 | | TETRUR | 0.8 | 99 |
| | | DRENCH | 0.16 | 99 |
| | | TETRUR | 0.8 | 50 |
| | | SPRÜH | 0.16 | 0 |
| Ib-22 | | TETRUR | 4 | 90 |
| | | DRENCH | 0.8 | 90 |
| | | TETRUR | 4 | 30 |
| | | SPRÜH | 0.8 | 0 |

TABLE 1-continued

| Compound | Structure | Test | Concentration in ppm | % effect after 14 d |
|---|---|---|---|---|
| Ib-24 | | TETRUR DRENCH | 0.8 | 100 |
| | | TETRUR SPRÜH | 0.8 | 30 |
| Ib-25 | | TETRUR DRENCH | 0.8 | 99 |
| | | TETRUR SPRÜH | 0.8 | 50 |

Comparision of the results following spray or drench application shows that the compounds of the formula (I) exhibit better activity after drench application than after spray application. By virtue of their very good systemic activity, the compounds of the formula (I) are therefore particularly suitable for all application forms where systemic action is required or advantageous.

The invention claimed is:

1. A method for controlling animal pests with one or more of N-arylamidine-substituted trifluoroethyl sulphoxide derivatives of formula (I)

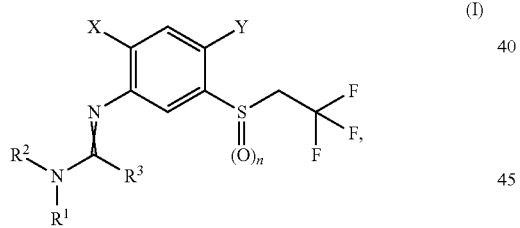

(I)

where
n represents the number 1,
X represents fluorine, chlorine, bromine, or iodine,
Y represents $(C_1-C_4)$-alkyl or $(C_1-C_4)$-haloalkyl,
$R^2$ represents hydrogen, $(C_1-C_4)$-alkyl or $(C_1-C_4)$-haloalkyl, and
$R^1$ and $R^3$ together with the atoms to which they are attached represent the group

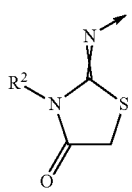

where the arrow points to the remainder of the molecule,
wherein the compound of the formula (I) is its R enantiomer, with respect to the chiral sulphur atom, or is a mixture of the R enantiomer and the S enantiomer in which the proportion of the R enantiomer is at least 55% by weight, based on the enantiomer mixture,
comprising drenching soil, applying by drip application to the soil, immersing roots, tubers or bulbs in soil or an artificial growth substrate, or applying by soil injection with the derivative of formula (I) to thereby control the animal pests.

2. A method according to claim 1, wherein
X and Y represent the following combinations X/Y: F/methyl or Cl/methyl, and
$R^1$ and $R^3$ together with the atoms to which they are attached represent the group

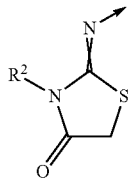

where the arrow points to the remainder of the molecule.

3. A method according to claim 1, wherein
X and Y represent the following combinations X/Y: F/methyl or Cl/methyl,
$R^2$ represents hydrogen, methyl, ethyl, (2,2)-difluoroethyl or (2,2,2)-trifluoroethyl, and
$R^1$ and $R^3$ together with the atoms to which they are attached represent the group where the arrow points to the remainder of the molecule.

4. A method according to claim 1, wherein the compound of the formula (I) is its R enantiomer.

5. A method according to claim 1, wherein the compound of the formula (I) is a mixture of the S enantiomer and the R enantiomer in which the proportion of the R enantiomer is at least 55% by weight, based on the enantiomer mixture.

6. A method according to claim 1, where the plant treated is grown in an artificial growth substrate.

7. A method according to claim 1, where the plant treated is planted in a closed system.

8. A method according to claim 1, where the plants treated are selected from the group consisting of
vegetables, optionally fruiting vegetables or inflorescences, optionally bell peppers, chilies, tomatoes, aubergines, cucumbers, pumpkins, courgettes, broad beans, runner beans, dwarf beans, peas, artichokes, maize;
leafy vegetables, optionally head-forming lettuce, chicory, endives, various types of cress, rocket, lamb's lettuce, iceberg lettuce, leeks, spinach, Swiss chard;
tuber, root or stem vegetables, optionally celeriac/celery, beetroot, carrots, radishes, horseradish, beets for human consumption scorzonera, asparagus, palm shoots, bamboo shoots;
bulb vegetables, optionally onions, leek, fennel, garlic;
*Brassica* vegetables, optionally cauliflower, broccoli, kohlrabi, red cabbage, white cabbage, curly kale, Savoy cabbage, Brussel sprouts, Chinese cabbage;
citrus, optionally oranges, grapefruits, tangerines, lemons, limes, seville oranges, kumquats, satsumas;
pome fruit, optionally apples, pears or quinces;
stone fruit, optionally peaches, nectarines, cherries, plums, quetsch, apricots, almonds, pistachios, olives;
grapevines, hops, tea or tropical crops, in particular mangoes, papayas, figs, pineapples, dates, bananas, durians, kaki fruit, coconuts, cacao, coffee, avocados, lychees, maracujas, guavas, almonds or nuts, optionally hazelnuts, walnuts, pistachios, cashew nuts, para nuts, pecan nuts, butternuts, chestnuts, hickory nuts, macadamia nuts, peanuts;
soft fruit, optionally redcurrants, gooseberries, raspberries, blackberries, blueberries, strawberries, cranberries, including American cranberries, kiwi fruit;
cut flowers, optionally roses, carnations, *gerbera*, lilies, marguerites, chrysanthemums, tulips, narcissi, anemones, poppies, amaryllis, dahlias, azaleas, mauves;
bedding plants, pot plants or perennials, optionally roses, *Tagetes*, violas, geraniums, fuchsias, hibiscus, chrysanthemums, busy lizzies, cyclamen, African violet, sunflowers, begonias;
bushes or conifers, optionally *ficus, rhododendron*, firs, spruces, pines, including umbrella pines, yews, juniper, *oleander;*
spices, optionally aniseed, chili pepper, paprika, pepper, vanilla, majoram, thyme, cloves, juniper berries, cinnamon, tarragon, coriander, saffron, ginger;
cotton; and
soya beans.

9. A method according to claim 1, wherein the animal pests are insects and/or spider mites and/or nematodes.

10. A method according to claim 1, where X and Y represent one of the following combinations X/Y: F/methyl, Cl/methyl, Br/methyl, F/ethyl, Cl/ethyl, or Br/ethyl.

11. A method according to claim 1, wherein the compound is of formula

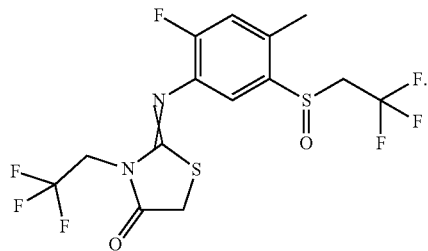

12. A method according to claim 4, wherein the compound is of formula

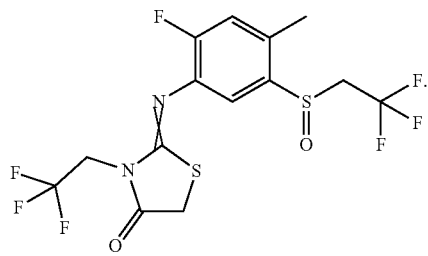

13. A method according to claim 5, wherein the compound is of formula

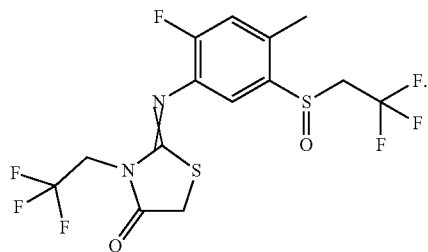

14. A method according to claim 1, comprising drenching soil with the derivative of formula (I).

15. A method according to claim 11, comprising drenching soil with the derivative of formula

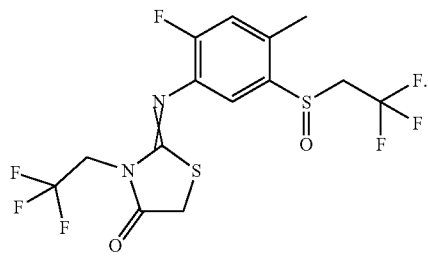

* * * * *